United States Patent
Chen et al.

(10) Patent No.: US 12,250,399 B2
(45) Date of Patent: *Mar. 11, 2025

(54) METHOD, DEVICE, AND SYSTEM FOR DETERMINING PREDICTION WEIGHT FOR MERGE MODE

(71) Applicant: ALIBABA GROUP HOLDING LIMITED, Grand Cayman (KY)

(72) Inventors: Jie Chen, San Mateo, CA (US); Ru-Ling Liao, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 3 days.

This patent is subject to a terminal disclaimer.

(21) Appl. No.: 17/811,239

(22) Filed: Jul. 7, 2022

(65) Prior Publication Data
US 2022/0345741 A1 Oct. 27, 2022

Related U.S. Application Data

(63) Continuation of application No. 16/805,573, filed on Feb. 28, 2020, now Pat. No. 11,394,999.

(60) Provisional application No. 62/816,879, filed on Mar. 11, 2019.

(51) Int. Cl.
*H04N 19/573* (2014.01)
(52) U.S. Cl.
CPC ................... *H04N 19/573* (2014.11)
(58) Field of Classification Search
CPC ........ H04N 19/46; H04N 19/52; H04N 19/54; H04N 19/573; H04N 19/577
See application file for complete search history.

(56) References Cited

U.S. PATENT DOCUMENTS

| | | | |
|---|---|---|---|
| 11,394,999 B2* | 7/2022 | Chen | ................ H04N 19/573 |
| 2017/0374379 A1 | 12/2017 | Chen et al. | |
| 2018/0098063 A1 | 4/2018 | Chen et al. | |
| 2018/0184126 A1 | 6/2018 | Zhang et al. | |
| 2018/0270500 A1 | 9/2018 | Li et al. | |
| 2018/0332298 A1 | 11/2018 | Liu et al. | |

(Continued)

FOREIGN PATENT DOCUMENTS

| | | |
|---|---|---|
| CN | 108605137 A | 9/2018 |
| WO | WO 2017/148345 A1 | 9/2017 |

(Continued)

OTHER PUBLICATIONS

"Generalized Bi-prediction Method for Future Video Coding"—Chen et al., 2016 Picture Coding Symposium (PCS), Date of Conference: Dec. 4-7, 2016. (Year: 2016).*

(Continued)

*Primary Examiner* — Mainul Hasan
(74) *Attorney, Agent, or Firm* — Finnegan, Henderson, Farabow, Garrett & Dunner, LLP

(57) ABSTRACT

Systems, devices, and methods for determining prediction weight for sub-block are provided. One exemplary method includes: partitioning a coding unit into a plurality of sub-blocks; determining a weight of a sub-block of the plurality of sub-blocks based on weights of control points, wherein the control points are neighboring corners of the coding unit; and bi-predicting the sub-block based on the determined weight.

20 Claims, 21 Drawing Sheets

(56) References Cited

U.S. PATENT DOCUMENTS

| | | | |
|---|---|---|---|
| 2019/0182503 A1* | 6/2019 | Tsai | H04N 19/54 |
| 2020/0059651 A1* | 2/2020 | Lin | H04N 19/149 |
| 2020/0177911 A1 | 6/2020 | Aono et al. | |
| 2020/0204807 A1* | 6/2020 | Ye | H04N 19/577 |
| 2020/0213585 A1* | 7/2020 | Huang | G06F 1/03 |
| 2020/0221120 A1* | 7/2020 | Robert | H04N 19/154 |
| 2020/0228815 A1* | 7/2020 | Xu | H04N 19/52 |
| 2020/0244979 A1* | 7/2020 | Li | H04N 19/159 |
| 2020/0359049 A1 | 11/2020 | Zhao et al. | |
| 2021/0195177 A1* | 6/2021 | Zhang | H04N 19/537 |
| 2021/0258575 A1* | 8/2021 | Zhang | H04N 19/46 |

FOREIGN PATENT DOCUMENTS

| | | | |
|---|---|---|---|
| WO | WO 2017/197146 | 11/2017 | |
| WO | WO 2018/067848 A1 | 4/2018 | |
| WO | WO 2018097692 A2 | 5/2018 | |
| WO | WO 2018097692 A3 | 5/2018 | |
| WO | WO 2019/002215 A1 | 1/2019 | |
| WO | WO-2020084511 A1 * | 4/2020 | H04N 19/105 |
| WO | WO 2020/098782 | 5/2020 | |
| WO | WO-2020147747 A1 * | 7/2020 | H04N 19/105 |

OTHER PUBLICATIONS

"Generalized Bi-prediction Method for Future Video Coding"—Chun-Chi Chen, Xiaoyu Xiu, Yuwen He, and Yan Ye; 2016 Picture Coding Symposium (PCS); Date of Conference: Dec. 4-7, 2016 (Year: 2016).*

European Patent Office Communication issued for Application No. 20769820.0 which encloses the extended European Search Report which includes pursuant to Rule 62 EPC, the Supplementary European Search Report (Art. 153(7) EPC) and the European search opinion, dated Oct. 10, 2022, 14 pages.

Bross et al., "Versatile Video Coding (Draft 4), "JVET-M1001-6, 13$^{th}$ Meeting, Marrakech, MA Jan. 9-18, 2019, 296 pages.

Chen et al., "Non-CE2: Gbi inheritance for constructed affine merge candidate," JVET-N0481-v1, 14$^{th}$ Meeting, Geneva, CH, Mar. 19-27, 2019, 4 pages.

Chen et al., "Algorithm description for Versatile Video Coding and Test Model 4 (VTM 4)," JVET-M1002-v1, 13$^{th}$ Meeting, Marrakech, MA, Jan. 9-18, 2019, 63 pages.

Su et al., "CE4-related: Generallized bi-prediction improvements combined from JVET-L0197 and JVET-L0296," JVET-L0646-v2, 12$^{th}$ meeting: Macao, CN, Oct. 3-12, 2018, 5 pages.

PCT International Search Report and Written Opinion mailed May 20, 2020, issued in corresponding International Application No. PCT/US2020/020483 (14 pgs.).

Chen et al., "Generalized Bi-prediction Method for Future Video Coding," 2016 Picture Coding Symposium (PCS), 5 pages, 2016.

European Patent Office Communication issued for Application No. 20769820.0 which encloses the extended European Search Report dated Oct. 12, 2022, 15 pages.

Li et al., "CE4-related: Constraint on GBi index inheritance in Merge Mode," JVET-M0433, 13$^{th}$ Meeting: Marrakech, MA, Jan. 9-18, 2019.

Bross et al., "Versatile Video Coding (Draft 4)," JVET-M1001-v7, 13$^{th}$ Meeting: Marrakech, MA, Jan. 9-18, 2019, 302 pages.

Chen et al., "Test Model 4 of Versatile Video Coding (VTM 4)," JVET-M1002-v2, 13 Meeting: Marrakech, MA, Jan. 9-18, 2019, 63 pages.

Chinese Search Report issued in corresponding Chinese Application No. 202080016124.2 (3 pages), Aug. 15, 2023.

* cited by examiner

METHOD, DEVICE, AND SYSTEM FOR DETERMINING PREDICTION WEIGHT FOR MERGE MODE

CROSS-REFERENCE TO RELATED APPLICATION

This application is a continuation of U.S. patent Ser. No. 16/805,573, filed on Feb. 28, 2020, which is based on and claims priority to U.S. Provisional Patent Application No. 62/816,879, filed on Mar. 11, 2019, both of which are incorporated herein by reference in their entireties.

TECHNICAL FIELD

The present disclosure generally relates to video data processing, and more particularly, to methods, devices, and systems of determining prediction weight for merge mode.

BACKGROUND

Video coding are often used to convert and compress digital video signals, for instance, to reduce storage space consumed or to reduce transmission bandwidth consumption associated with such signals.

A video coding system may implement various tools or techniques to solve different problems involved in the coding process. For example, in the video coding process, the input video data can be partitioned into block units of different sizes and processed block by block. In the prediction process, the blocks can be predicted using various prediction modes, such as intra prediction mode and inter prediction mode. Based on the size of the block, different prediction modes may be applied. Various techniques have been proposed to improve the efficiency and accuracy of video coding, and to reduce the computational complexity involved.

However, application of different techniques may be subject to different conditions. For example, some techniques may require the coding unit satisfy various conditions, or that the coding unit be coded in a particular mode. As another example, in the weight prediction process, some techniques may only apply to the processing of some motion vector candidates, but not others. Combination of different techniques may not be feasible for processing all the blocks or all the sub-blocks. It is therefore desirable to properly combine or select different techniques, taking into account of their respective applicability conditions.

SUMMARY OF THE DISCLOSURE

The embodiments of the present disclosure provide methods, devices, and systems for determining prediction weight in video data processing. According to some exemplary embodiments, a method performed by a decoder of video data comprises: determining a weight for at least one of an inherited affine merge candidate, a constructed affine merge candidate, or a zero motion vector of a coding unit; and bi-predicting the coding unit based on the determined weight. In some embodiments, the weight can be determined based on a weight index signaled in a bitstream.

In some embodiments, methods implemented by a decoder for obtaining a weight for a constructed affine merge candidate with a plurality of control points are provided. One exemplary method comprises: in response to a plurality of control points associated with the constructed affine merge candidate having one or more weights, determining the weight for the constructed affine merge candidate based on a weight associated with a top left control point or a weight associated with a top right control point.

In some embodiments, methods implemented by a decoder for obtaining a weight for a constructed affine merge candidate with a plurality of control points are provided. One exemplary method comprises: in response to a plurality of control points associated with a constructed affine merge candidate having a same weight, determining the weight of the plurality of control points as a weight of the constructed affine merge candidate; and in response to the plurality of control points having different weights, determining a default value as the weight of the constructed affine merge candidate.

In some embodiments, methods for determining prediction weight in video data processing are provided. One exemplary method comprises: among weights of the plurality of control points, determining a weight of a first sub-block within a coding unit based on weights of control points of the coding unit; generating a motion predictor of the first sub-block based on the determined weight; processing the coding unit based on the motion predictor.

In some embodiments, devices for determining prediction weight in video data processing are provided. One exemplary video processing apparatus comprises: a memory storing instructions; and a processor configured to execute the instructions to cause the device to: determine a weight for at least one of an inherited affine merge candidate, a constructed affine merge candidate, or a zero motion vector of a coding unit; and bi-predict the coding unit based on the determined weight.

In some embodiments, devices for determining prediction weight in video data processing are provided. One exemplary video processing apparatus comprises: determine a weight of a first sub-block within a coding unit based on weights of control points of the coding unit; generate a motion predictor of the first sub-block based on the determined weight; and process the coding unit based on the motion predictor.

In some embodiments, non-transitory computer-readable media are provided. One exemplary non-transitory computer-readable medium stores a set of instructions that is executable by one or more processors of a video processing device to cause the device to perform a method comprising: determining a weight for at least one of an inherited affine merge candidate, a constructed affine merge candidate, or a zero motion vector of a coding unit; and bi-predicting the coding unit based on the determined weight.

In some embodiments, non-transitory computer-readable media are provided. One exemplary non-transitory computer-readable medium stores a set of instructions that is executable by one or more processors of a video processing device to cause the device to perform a method comprising: determining a weight of a first sub-block within a coding unit based on weights of control points of the coding unit; generating a motion predictor of the first sub-block based on the determined weight; and processing the coding unit based on the motion predictor.

In some embodiments, non-transitory computer-readable media are provided. One exemplary non-transitory computer readable medium stores a bitstream. The bitstream includes a flag indicating a coding unit being partitioned into a plurality of sub-blocks, wherein the flag causes a decoder to: determine a weight of a sub-block of the plurality of sub-blocks based on weights of control points, wherein the control points are neighboring corners of the coding unit; and bi-predict the sub-block based on the determined weight.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
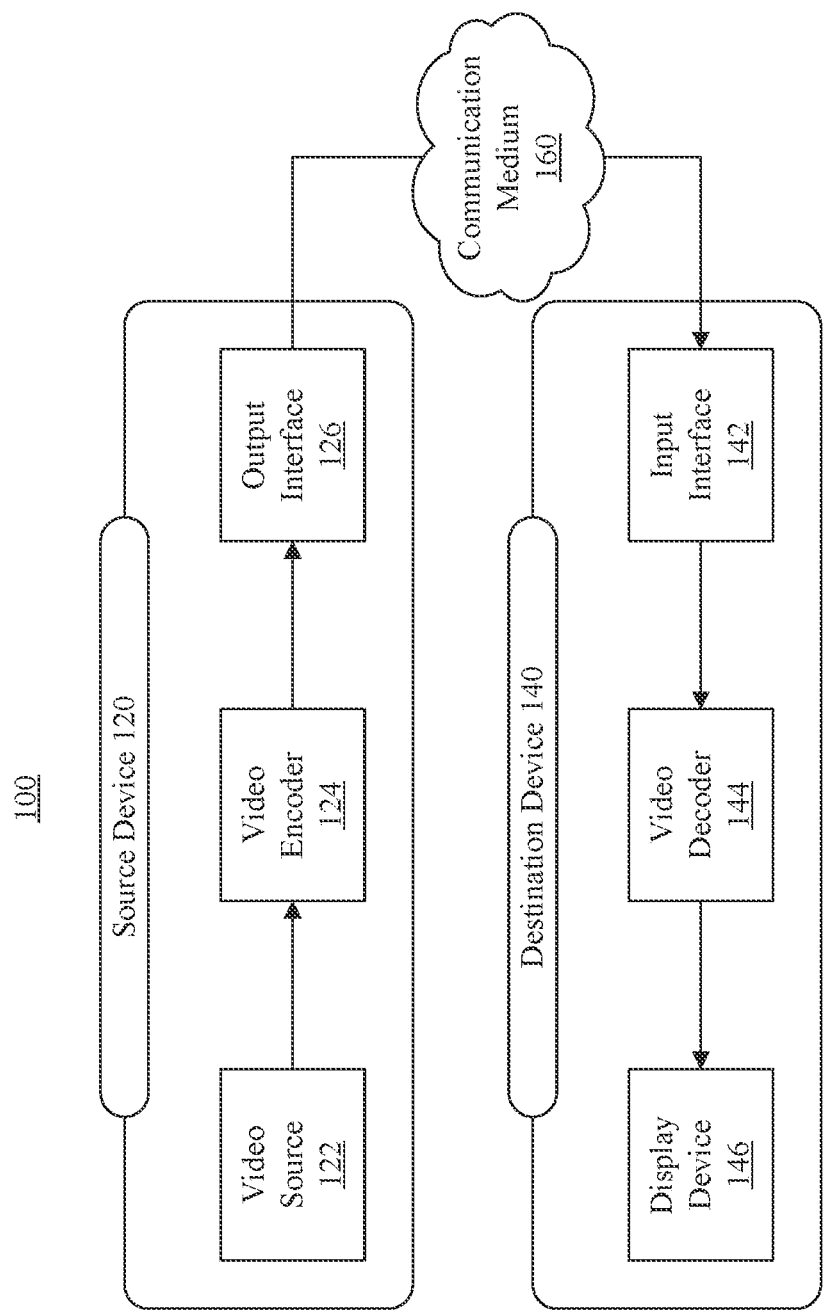
FIG. 1 is a schematic diagram illustrating an exemplary video encoding and decoding system, consistent with some embodiments of the present disclosure.

FIG. 1 is a block diagram illustrating an example video encoding and decoding system 100 that may utilize techniques in compliance with various video coding standards, such as HEVC/H.265 and VVC/H.266. As shown in FIG. 1, system 100 includes a source device 120 that provides encoded video data to be decoded at a later time by a destination device 140. Consistent with some embodiments of the present disclosure, each of source device 120 and destination device 140 may include any of a wide range of devices, such as a desktop computer, a notebook (e.g., laptop) computer, a tablet computer, a set-top box, a mobile phone, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include a video source 122, a video encoder 124, and an output interface 126. Destination device 140 may include an input interface 142, a video decoder 144, and a display device 146. In some embodiments, a source device and a destination device may further include other components or arrangements. For example, source device 120 may receive video data from an external video source (not shown), such as an external camera. Likewise, destination device 140 may interface with an external display device, rather than including an integrated display device.

Although in the following description, some techniques are explained as being performed by a video encoding device, the techniques may also be performed by a video encoder/decoder, typically referred to as a "CODEC." Moreover, the techniques of the present disclosure may also be performed by a video preprocessor. Source device 120 and destination device 140 are merely examples of such coding devices in which source device 120 generates coded video data for transmission to destination device 140. In some embodiments, source device 120 and destination device 140 may operate in a substantially symmetrical manner such that each of source device 120 and destination device 140 includes video encoding and decoding components. Hence, system 100 may support one-way or two-way video transmission between source device 120 and destination device 140, e.g., for video streaming, video playback, video broadcasting, or video telephony.

Video source 122 of source device 120 may include a video capture device, such as a video camera, a video archive containing previously captured video data, or a video feed interface to receive video from a video content provider. As a further alternative, video source 122 may generate computer graphics-based data as the source video, or a combination of live video, archived video, and computer-generated video. The captured, pre-captured, or computer-generated video may be encoded by video encoder 124. The encoded video information may then be output by output interface 126 onto a communication medium 160.

Output interface 126 may include any type of medium or device capable of transmitting the encoded video data from source device 120 to destination device 140. For example, output interface 126 may include a transmitter or a transceiver configured to transmit encoded video data from source device 120 directly to destination device 140 in real-time. The encoded video data may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded video data from source device 120 and provide the encoded video data to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded video data. In some embodiments, a computing device of a medium production facility, such as a disc stamping facility, may receive encoded video data from source device 120 and produce a disc containing the encoded video data.

Input interface 142 of destination device 140 receives information from communication medium 160. The received information may include syntax information including syntax elements that describe characteristics or processing of blocks and other coded units. The syntax information is defined by video encoder 124 and used by video decoder 144. Display device 146 displays the decoded video data to a user and may include any of a variety of display devices such as a cathode ray tube (CRT), a liquid crystal display (LCD), a plasma display, an organic light emitting diode (OLED) display, or another type of display device.

As another example, the encoded video generated by source device 120 may be stored on a file server or a storage device. Input interface 142 may access stored video data from the file server or storage device via streaming or download. The file server or storage device may be any type of computing device capable of storing encoded video data and transmitting that encoded video data to destination device 140. Examples of a file server include a web server that supports a website, a file transfer protocol (FTP) server, a network attached storage (NAS) device, or a local disk drive. The transmission of encoded video data from the storage device may be a streaming transmission, a download transmission, or a combination thereof.

Video encoder 124 and video decoder 144 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in the form of software, a device may store instructions for the software in a suitable, non-transitory computer-readable medium, and execute the instructions in hardware using one or more processors to perform the techniques of this disclosure. Each of video encoder 124 and video decoder 144 may be included in one or more encoders or decoders, either of which may be integrated as part of a combined encoder/decoder (CODEC) in a respective device.

Video encoder 124 and video decoder 144 may operate according to any video coding standard, such as the Versatile Video Coding (VVC/H.266) standard, the High Efficiency Video Coding (HEVC/H.265) standard, the ITU-T H.264 (also known as MPEG-4) standard, etc. Although not shown in FIG. 1, in some embodiments, video encoder 124 and video decoder 144 may each be integrated with an audio encoder and decoder, and may include appropriate MUX-DEMUX units, or other hardware and software, to handle encoding of both audio and video in a common data stream or separate data streams.

Figure 2:
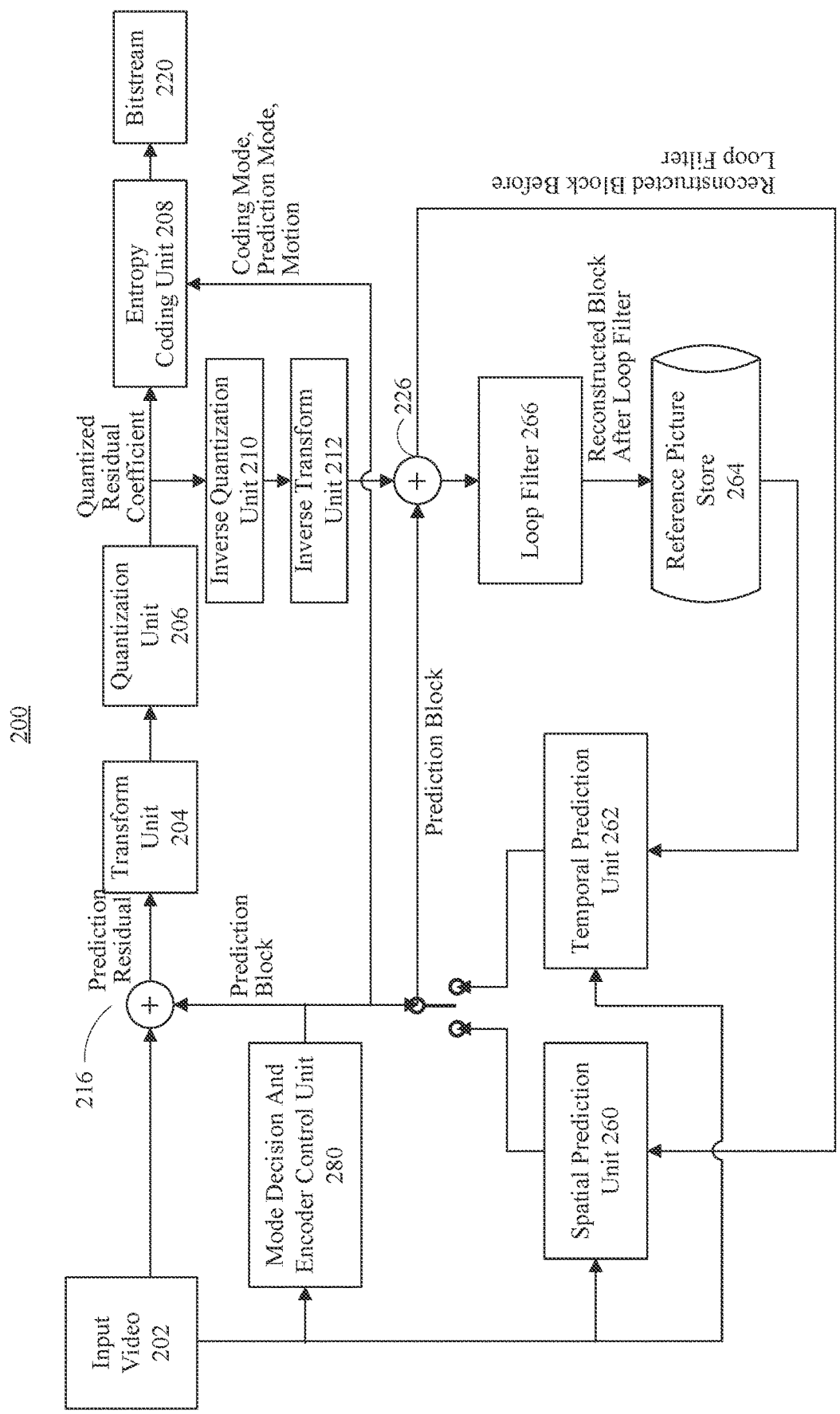
FIG. 2 is a schematic diagram illustrating an exemplary video encoder that may be a part of the exemplary system of FIG. 1, consistent with some embodiments of the present disclosure.

FIG. 2 is a schematic diagram illustrating an exemplary video encoder 200, consistent with the disclosed embodiments. For example, video encoder 200 may be used as video encoder 124 in system 100 (FIG. 1). Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64×64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors. In unit-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

Figure 3:
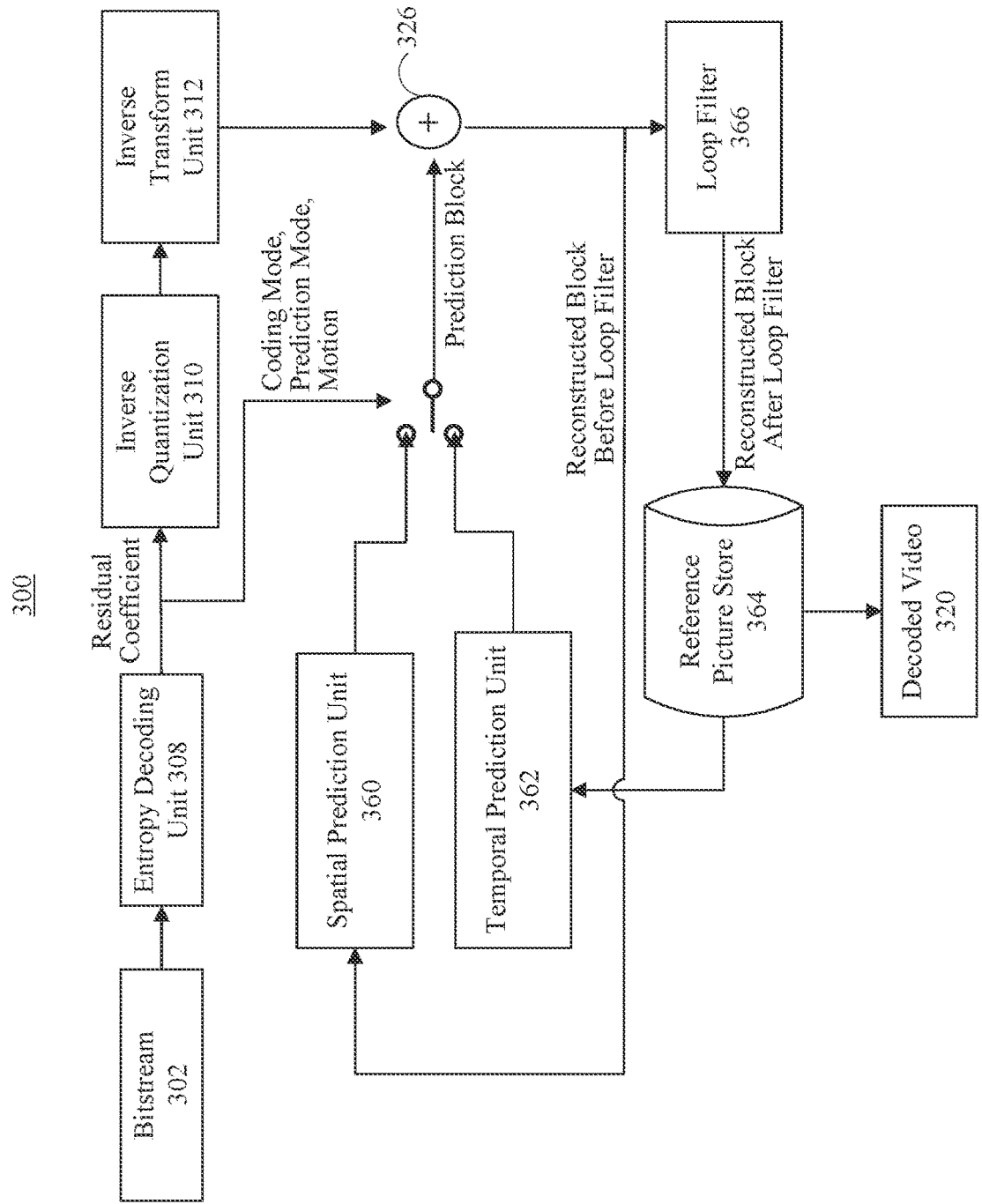
FIG. 3 is a schematic diagram illustrating an exemplary video decoder that may be a part of the exemplary system of FIG. 1, consistent with some embodiments of the present disclosure.

FIG. 3 is a schematic diagram illustrating a video decoder 300, consistent with the disclosed embodiments. For example, video decoder 300 may be used as video decoder 144 in system 100 (FIG. 1). Referring to FIG. 3, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as the display device 146 as described in system 100 (FIG. 1).

In some embodiments, affine motion prediction can be applied. In HEVC, for example, a translational motion model is applied for motion compensation prediction (MCP). While in the real world, there are many kinds of motion, such as zooming in/out, rotation, perspective motions, and other irregular motions. In VVC, a block-based affine transform motion compensation prediction is applied. As shown FIGS. 4A and 4B, the affine motion field of the block can be described by motion information of two control point (4-parameter affine motion model, see FIG. 4A), or three control point motion vectors (6-parameter affine motion model, see FIG. 4B).

Figures 4A, 4B:
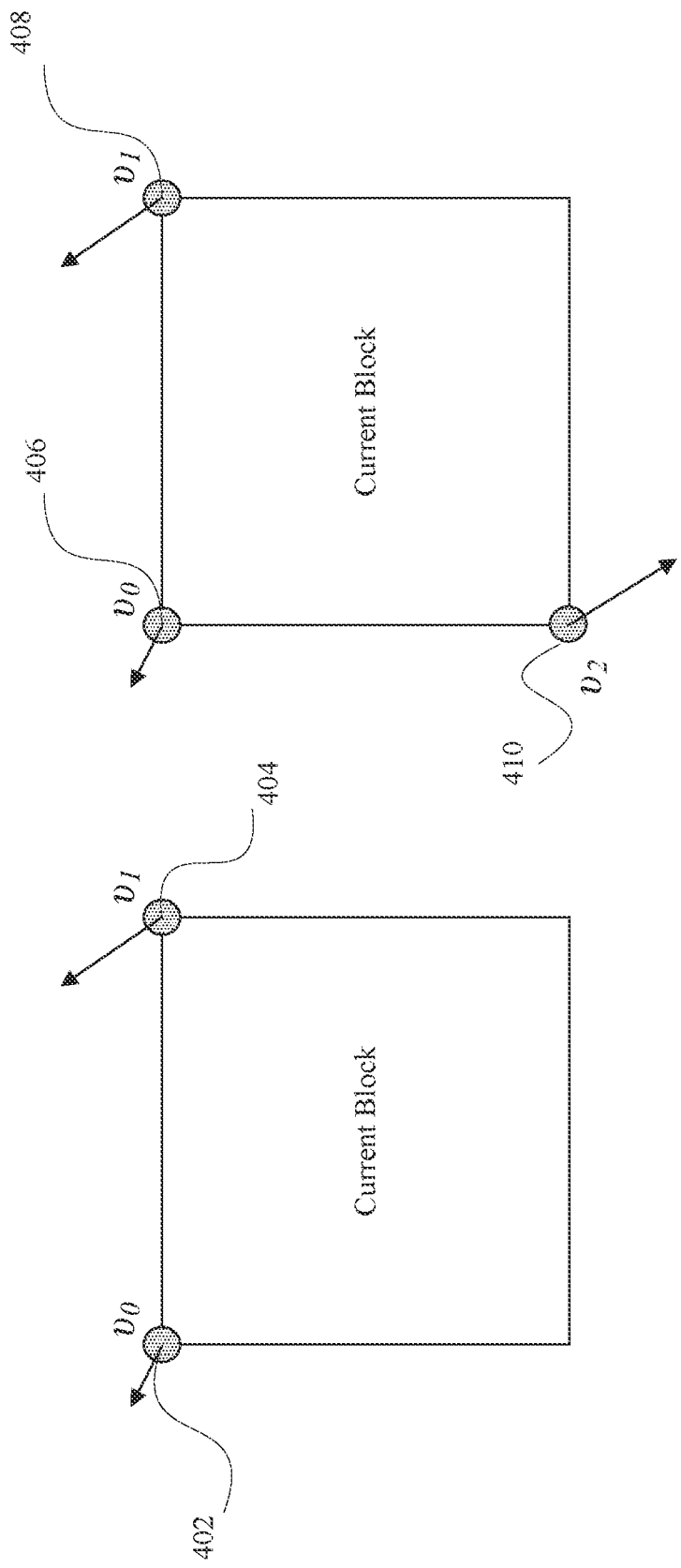
FIG. 4A is a schematic diagram of an exemplary two-control-point affine motion model, according to some embodiments of the present disclosure.
FIG. 4B is a schematic diagram of an exemplary three-control-point affine motion model, according to some embodiments of the present disclosure.

As shown in FIG. 4A, $v_0$ represents a control point motion vector for the top-left corner control point (CP) 402, and v represents a control point motion vector for the top-right corner CP 404. For the 4-parameter affine motion model, motion vector at sample location (x, y) in a block can be derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (1)$$

where (mv0x, mv0y) indicates motion vector of the top-left corner CP 402, (mv1x, mv1y) indicates motion vector of the top-right corner CP 404.

As shown in FIG. 4B, in the 6-parameter affine motion model, $v_0$ represents a control point motion vector for the top-left corner control point (CP) 406, $v_1$ represents a control point motion vector for the top-right corner CP 408, and $v_2$ represents a control point motion vector for the bottom-left corner CP 410. For 6-parameter affine motion model, motion vector at sample location (x, y) in a block can be derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2)$$

where (mv0x, mv0y) indicates motion vector of the top-left corner CP 406, (mv1x, mv1y) indicates motion vector of the top-right corner CP 408, and (mv2x, mv2y) indicates motion vector of the bottom-left corner CP 410.

Figure 5:
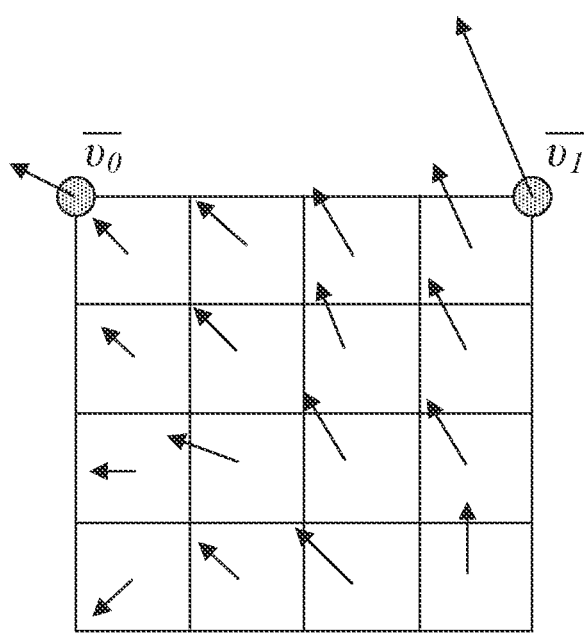
FIG. 5 is a schematic diagram illustrating exemplary affine motion vector field (MVF) per sub-block, according to some embodiments of the present disclosure.

In some embodiments, to simplify the motion compensation prediction process, block-based affine transform prediction can be applied. To derive the motion vector of each 4×4 luma sub-block, the motion vector of the center sample of each sub-block, as shown in FIG. 5, can be calculated according to above equations (1) and (2), and rounded to $\frac{1}{16}$ fraction accuracy. The arrows in FIG. 5 indicate motion vectors corresponding to each sub-block. Then the motion compensation interpolation filters can be applied to generate the prediction of each sub-block with the derived motion vector. The sub-block size of chroma-components can also be set to be 4×4. The motion vector of a 4×4 chroma sub-block can be calculated as the average of the motion vectors of the four corresponding 4×4 luma sub-blocks.

As performed for translational motion inter prediction, there are also two affine motion inter prediction modes: affine merge mode and affine Advanced Motion Vector Prediction (AMVP) mode. Affine merge mode can be applied for CUs with both width and height larger than or equal to 8. In AMVP mode, the control point motion vectors (CPMVs) of the current CU can be generated based on the motion information of the spatial neighboring CUs. There can be up to five CPMVs candidates. An index can be signalled to indicate the one candidate to be used for the current CU. The following three types of CPMVs candidates are used to form the affine merge candidate list: (1) inherited affine merge candidates that are extrapolated from the CPMVs of the neighbouring CUs; (2) constructed affine merge candidates CPMVs that are derived using the translational motion vectors (MVs) of the neighbouring CUs; (3) Zero MVs. The three types of candidates are further described below.

Figure 6:
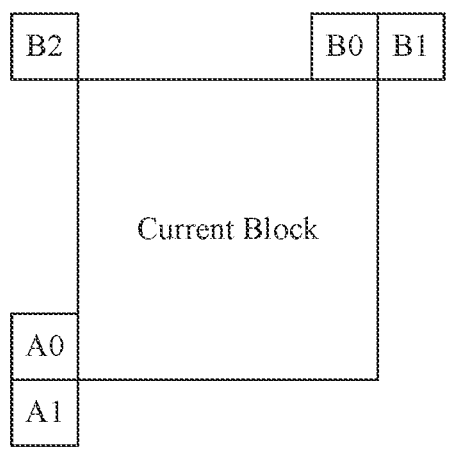
FIG. 6 is a schematic diagram illustrating exemplary locations of inherited affine motion predictors, according to some embodiments of the present disclosure.

In VVC, there can be maximum two inherited affine merge candidates. The two inherited affine merge candidates are derived from affine motion model of the neighboring blocks, one from left neighboring CUs and one from above neighboring CUs. The candidate blocks A0, A1, B0, B1, and B2 are shown in FIG. 6. For the left motion vector predictor, the neighboring blocks can be checked in the following order: A0->A1. For the above motion vector predictor, the neighboring blocks can be checked in the following order: B0->B1->B2. The first inherited candidate from each side (left and above) can be selected. That is, on each side, the first neighboring block coded in affine mode in the checking order is selected. Further, pruning check may not be performed between two inherited candidates.

Figure 7:
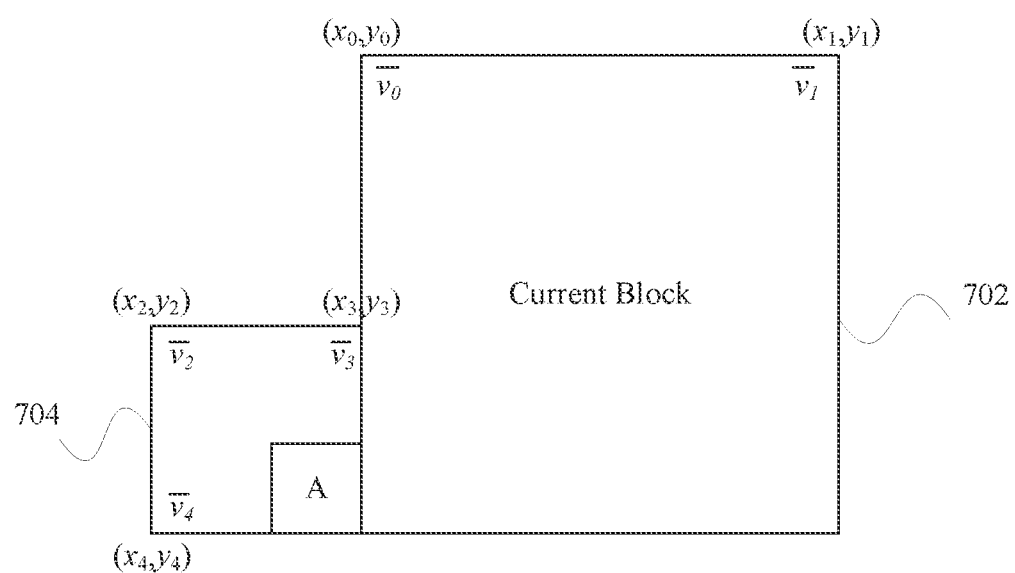
FIG. 7 is a schematic diagram illustrating an example of control point motion vector inheritance, according to some embodiments of the present disclosure.

When a neighboring affine CU is identified, its control point motion vectors can be used to derive the CPMV candidates in the affine merge list of the current CU. As shown in FIG. 7, if the neighbour bottom-left block A is coded in affine mode, the motion vectors $v_2$, $v_3$ and $v_4$ of the top-left corner, above right corner, and bottom-left corner of the CU 704 which contains the block A can be attained. If block A is coded with the 4-parameter affine model, the two CPMVs of the current CU 702 can be calculated according to $v_2$ and $v_3$. Alternatively, if block A is coded with the 6-parameter affine model, the three CPMVs of the current CU 702 can be calculated according to $v_2$, $v_3$ and $v_4$.

Figure 8:
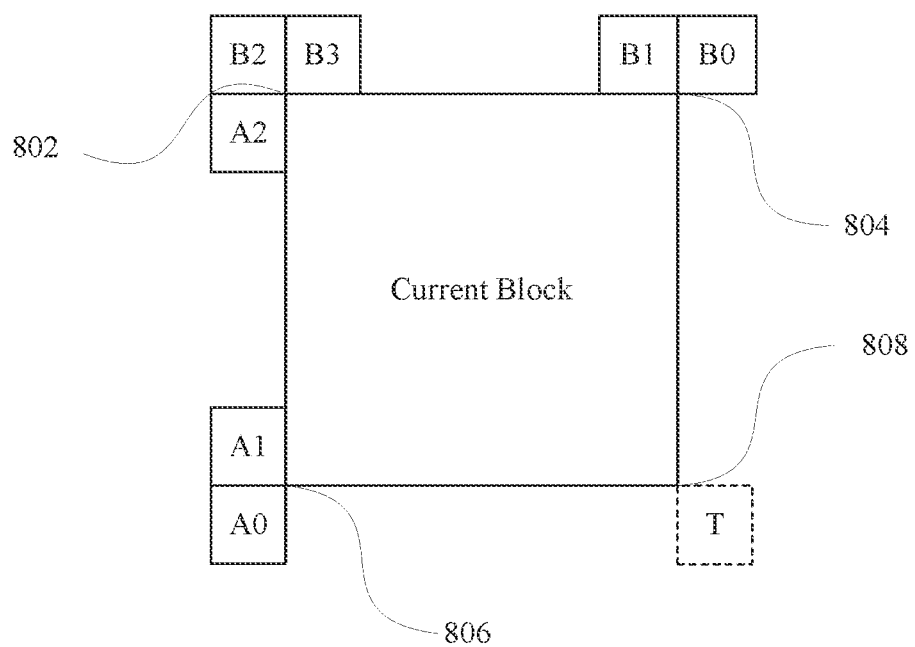
FIG. 8 is a schematic diagram illustrating exemplary candidate positions for constructed affine merge mode, according to some embodiments of the present disclosure.

A constructed affine candidate means that the candidate is constructed by combining the neighbor motion information of each control point. As shown in FIG. 8, the motion information for the four control points 802, 804, 806, and 808 can be derived from the specified spatial neighbors and temporal neighbor. $CPMV_k$ (k=1, 2, 3, 4) can be used to represent the motion vector of k-th control point $CP_k$. For $CPMV_1$ corresponding to CP 801, neighboring blocks B2, B3, and A2 can be check according to the following order: B2->B3->A2. The MV of the first available block can be used. For $CPMV_2$ corresponding to CP 804, neighboring blocks B1 and B0 can be checked in the following order: B1->B0. For $CPMV_3$ corresponding to CP 806, the neighboring blocks A1 and A0 can be checked in the following order: A1->A0. For $CPMV_4$ corresponding to CP 808, temporal motion vector predictor (TMVP) can be used as $CPMV_4$ if it's available.

After MVs of the four control points 802-808 are obtained, affine merge candidates can be constructed based on the motion information. The combinations of control point MVs can be used to construct the candidates in the following order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs can construct a 6-parameter affine merge candidate and the combination of 2 CPMVs can construct a 4-parameter affine merge candidate. In some embodiments, to avoid the motion scaling process, if the reference indices of control points are different, the corresponding combination of control point MVs can be discarded.

After inherited affine merge candidates and constructed affine merge candidate are checked, if the affine merge candidate list is still not full, zero MVs can be inserted to the end of the list.

Affine AMVP mode can be applied for CUs with both width and height larger than or equal to 16. An affine flag at CU level can signalled in the bitstream to indicate whether affine AMVP mode is used. If affine AMVP mode is used, another flag can be signalled to indicate whether 4-parameter affine or 6-parameter affine is used. The difference of the CPMVs of the current CU and their predictors (CPMVPs) can be signalled in the bitstream. The affine AMVP candidate list size is 2. The candidate list can be generated by using the following four types of CPMVPs candidates in the following order: (1) Inherited affine AMVP candidates that are extrapolated from the CPMVs of the neighbouring CUs; (2) Constructed affine AMVP candidates CPMVPs that are derived using the translational MVs of the neighbouring CUs; (3) Translational MVs from neighboring CUs; and (4) Zero MVs.

The checking order of inherited affine AMVP candidates can be the same as the checking order of inherited affine merge candidates, as described above. The only difference is that, for AMVP candidates, only the affine CU that has the same reference picture as that of the current block is considered. No pruning process is applied when inserting an inherited affine motion predictor into the candidate list.

Constructed AMVP candidates can be derived from the specified spatial neighbors, as shown in FIG. 8. The same checking order used in affine merge candidate construction can be used. In addition, reference picture index of the neighboring block is also checked. The first block in the checking order that is inter coded and has the same reference picture as in current CU is used. When the current CU is coded with 4-parameter affine mode, and $mv_0$ and $mv_1$ are both available, they can be added as one candidate in the affine AMVP list. When the current CU is coded with 6-parameter affine mode, and all three CPMVs are available, they are added as one candidate in the affine AMVP list. Otherwise, constructed AMVP candidate can be set as unavailable.

After inherited affine AMVP candidates and constructed AMVP candidate are checked, affine AMVP list candidates may still be less than 2. In that case, $mv_0$, $mv_1$ and $mv_2$ can be added, in order, as the translational MVs to predict all control point MVs of the current CU, when available. Finally, if the affine AMVP candidate list is still not full, zero MVs can be used to fill the list.

In some embodiments, bi-prediction with weighted averaging (BWA) can be applied. Traditionally, the bi-prediction signal is only generated by averaging two prediction signals obtained from two different reference pictures and/or using two different motion vectors. In VVC, the bi-prediction mode is extended beyond simple averaging to allow weighted averaging of the two prediction signals as shown in the equation below:

$$P_{bi-pred} = ((8-w)*P_0 + w*P_1 + 4) \gg 3 \quad (3)$$

Five weights are allowed in the weighted averaging bi-prediction, $w \in \{-2, 3, 4, 5, 10\}$. For each bi-predicted CU, the weight w can be determined in one of two ways: 1) for a non-merge CU, the weight index can be signalled after the motion vector difference; 2) for a merge CU, the weight index can be inferred from neighbouring blocks based on the merge candidate index. Weighted averaging bi-prediction can be applied to CUs with 256 or more luma samples, which means that the CU width times CU height is greater than or equal to 256. For low-delay pictures, all 5 weights can be used. For non-low-delay pictures, only 3 weights ($w \in \{3,4,5\}$) are used.

At the encoder side, fast search algorithms can be applied to find the weight index without significantly increasing the encoder complexity. Application of these algorithms can be summarized based on the following. When combined with adaptive motion vector resolution (AMVR), unequal weights are only conditionally checked for 1-pel and 4-pel motion vector precisions if the current picture is a low-delay picture. When combined with affine motion compensation, affine motion estimation (ME) will be performed for unequal weights if and only if the affine mode is selected as the current best mode. When the two reference pictures in bi-prediction are the same, unequal weights are only conditionally checked.

In some embodiments, unequal weights are not searched when certain conditions are met. Various factors may be takin into account, such as the picture order count (POC) distance between current picture and its reference pictures, the coding quantization parameter (QP), and the temporal level.

As noted above, when BWA is combined with merge prediction, the weight index can be inferred from neighbouring blocks based on the merge candidate index. However, this may not be always true in the case of affine merge prediction. As noted above, for affine merge prediction, there maybe the following three types of CPMVs candidates in the affine merge candidate list: 1) Inherited affine merge candidates that extrapolated from the CPMVs of the neighbouring CUs; 2) Constructed affine merge candidates CPMVs that are derived using the translational MVs of the neighbouring CUs; and 3) Zero MVs. When the first type of candidate (inherited affine merge candidates) is selected, the BWA weight index of the neighboring CU is also inherited. Accordingly, the weight index of the current CU used in the bi-prediction is the same as the weight index of the neighbouring CU from which the CPMV is inherited. However, when the second type of candidate (constructed affine merge candidates) or the third type of candidate (zero motion vector) is selected, the BWA weight index of the neighbouring CU is not inherited. Instead, in some techniques, equal weight can be used for the current CU by setting the current CU weight index as the default value.

The design described above has at least the following drawbacks. Based on the above design, there may be inconsistency of the BWA weight index inheritance between inherited affine merge candidates and constructed affine merge candidates, which are the two types of the CPMV candidates in the same candidate list. Accordingly, the encoder and the decoder need to distinguish these two types of candidates and use different logics to generate the BWA weight for the current CU. The inherited affine merge candidates are inherited from neighboring CU, while the constructed affine merge candidates are fixed. It therefore increases the processing complexity.

Further, the weight for the current CU can be fixed if the constructed affine merge candidate is selected loses the flexibility of the weight selection. BWA is adopted to the VVC standard because it increases the coding performance by offering more options of averaging weights in inter prediction. However, using the fixed equal weight reduces the benefits of BWA and therefore may compromise coding performance.

Furthermore, zero MVs are inserted into the affine merge candidate list when the candidate list is not full after inserting inherited affine merge candidates and constructed affine merge candidates. However, fixing the BWA weight for all the Zero MVs inserted into the candidate list means that the same MV candidates are duplicated in the list, which introduces redundancy in candidate signaling. In addition, as noted above, for the constructed affine merge candidate, the neighboring CU weight is not used. This departs from the design concept that the weight index is inferred from neighbouring blocks based on the merge candidate index when BWA is combined with merge mode.

To solve the problems described above, the following techniques are provided in the present disclosure.

One technique to address the above problems is through explicit weights signaling. With explicit signalling, the weight of the current CU can be selected by the encoder and the index of the weight selected can be explicitly signaled in the bitstream. It changes the concept that weight index is inferred from neighbouring blocks based on the merge candidate index. For the affine merge prediction, the weight of the current CU is no longer inferred from the neighboring CU. The encoder could choose any value from the candidate weights allowed and signal the value chosen in the bitstream.

In some embodiments of the present disclosure, the weights of all kinds of affine merge candidates, including inherited affine merge candidate, constructed affine merge candidate, and zero motion vector, can all be selected by the encoder and signaled in the bitstream. In some embodiments, the weights of some, but not all, affine merge candidates are selected by the encoder and signaled in the bitstream. For example, only for constructed affine merge candidate, the weight can be selected and signalled; and for other candidates (e.g., inherited affine merge candidate), the weights are inferred from the neighboring CUs or fixed to a default value.

In some embodiments of the present disclosure, the weight can be signaled by transmitting weight index in the bitstream.

Another technique to address the existing problems is through implicit weights derivation. With this technique, the weight is not fixed for the CU for which the constructed affine merge candidate is used. Instead, the weight can be inferred from the neighboring CUs. For each constructed affine merge candidate, a weight or weight index can be derived according to the CPs of this constructed affine merge candidate. If this constructed affine merge candidate is used for a CU, the weight or weight index derived can also be used for the CU.

For example, $CP_k$ (k=1, 2, 3, 4) can be used to represent the k-th CP. For each CP, neighboring CUs can be used to derive the corresponding CPMV. The neighboring CUs are also used to derive the weight or weight index of the CP. Generally speaking, there are 4 control points. Accordingly, a constructed affine merge candidate at most could have 4 different weights or weight indices. Thus, a rule can be specified to derive one weight or weight index for a constructed affine merge candidate from the at most 4 weights or weight indices. For example, a plurality of CPs, including a top left CP and/or a top right CP of the constructed affine merge candidate, have one or more weights. The weight for the constructed affine merge candidate can be determined based on the weight associated with the top left CP and/or the weight associated with the top right CP. Similarly, in some embodiments, a bottom left CP and/or a bottom right CP of the constructed affine merge candidate have one or more weights. The weight for the constructed affine merge candidate can be determined based on the weight associated with the bottom left CP and/or the weight associated with the bottom right CP. Examples of the derivation process are further described below. In some embodiments of the present disclosure, if all of the CPs have the same weight or weight index, then that weight or weight index can be used for the constructed affine merge candidate. If not all of the CPs have the same weight or weight index, a default value corresponding to equal weight can be used.

For example, for a constructed affine merge candidate with 2 CPs ($CP_a$, $CP_b$),

```
if (CP_a weight = = CP_b weight)
    the affine merge candidate weight = CP_a weight
else
    the affine merge candidate weight = default value
```

Moreover, for a constructed affine merge candidate with 3 CPs (CPa, CPb, CPc),

```
if (CP_a weight = = CP_b weight && CP_b weight= = CP_c weight )
    the affine merge candidate weight = CP_a weight
else
    the affine merge candidate weight = default value
```

Similarly, the above rule may also be applied to a constructed affine merge candidate with 4 or more CPs and the above operation may also be applied to weight index.

In some embodiments of this present disclosure, the weight or weight index of a constructed affine merge candidate can be the most probable weight or weight index. The most probable weight or weight index can correspond to the weight or weight index which is used by the most CPs of the constructed affine merge candidate. For example, for a constructed affine merge candidate with 2 CPs ($CP_a$, $CP_b$), the weight can be determined based on the following:

```
if (CP_a weight = = CP_b weight)
    the affine merge candidate weight = CP_a weight
else
    the affine merge candidate weight = default value
```

For a constructed affine merge candidate with 3 CPs (CPa, CPb, CPc), the weight can be determined based on the following:

```
if (CP_a weight = = CP_b weight )
    the affine merge candidate weight = CP_a weight
else if (CP_b weight= = CP_c weight )
    the affine merge candidate weight = CP_b weight
else if (CP_a weight= = CP_c weight )
    the affine merge candidate weight = CP_c weight
```

The above rules may also be applied to a constructed affine merge candidate with 4 or more CPs, and to the determination of weight index.

In some embodiments of the present disclosure, among all the weights of CPs of a constructed affine merge candidate, a weight which has the smallest difference from the equal weight can be used as the weight or weight index of the constructed affine merge candidate. For example, for a constructed affine merge candidate with 2 CPs ($CP_a$, $CP_b$), the weight can be determined based on the following:

```
Diff_a = |CP_a weight − equal weight|
Diff_b = |CP_b weight − equal weight|
if(Diff_a <= Diff_b)
    the affine merge candidate weight = CP_a weight
else
    the affine merge candidate weight = CP_b weight
```

For a constructed affine merge candidate with 3 CPs (CPa, CPb, CPc), the weight can be determined based on the following:

```
Diff_a = |CP_a weight − equal weight|
Diff_b = |CP_b weight − equal weight|
Diff_c = |CP_c weight − equal weight|
if(Diff_a <= Diff_b && Diff_a <= Diff_c )
    the affine merge candidate weight = CP_a weight
else if(Diff_b <= Diff_a && Diff_b <= Diff_c )
    the affine merge candidate weight = CP_b weight
else
    the affine merge candidate weight = CP_c weight
```

Alternatively, for a constructed affine merge candidate with 2 CPs (CPa, CPb), the weight can be determined based on the following:

```
if(CP_a weight>=equal weight && CP_b weight>=equal weight)
    the affine merge candidate weight = min(CP_a weight, CP_b weight)
else if (CP_a weight<=equal weight && CP_b weight<=equal weight)
    the affine merge candidate weight =max( CP_a weight,CP_b weight)
```

And for a constructed affine merge candidate with 3 CPs (CPa, CPb, CPc), the weight can be determined based on the following:

```
if(CP_a weight>=equal weight && CP_b weight>=equal weight && CP_c
weight>=equal weight )
   the affine merge candidate weight = min(CP_a weight, CP_b weight, CP_c weight)
else if (CP_a weight<=equal weight && CP_b weight<=equal weight && CP_c
weight<=equal weight)
   the affine merge candidate weight =max( CP_a weight,CP_b weight, CP_c weight)
else
   the affine merge candidate weight = equal weight, or the one closer to the
equal weight of the two on the same side of equal weight
```

Similarly, the above rules may also be applied to a constructed affine merge candidate with 4 or more CPs, and to the determination of weight index.

In some embodiments, the average of the CP weight or weight index can be used as the weight of constructed affine merge candidate. For example, for constructed affine merge candidate with 2 CPs ($CP_a$, $CP_b$), the weight can be determined based on the following:

```
weight =integer part of (CP_a weight + CP_b weight)/2
res = (CP_a weight + CP_b weight)%2
if(res= =0)
   the affine merge candidate weight= weight
else
   the affine merge candidate weight = round(CP_a weight + CP_b weight)/2
towards to equal weight
```

Moreover, for a constructed affine merge candidate with 3 CPs (CPa, CPb, CPc), the weight can be determined based on the following:

```
weight =integer part of (CP_a weight + CP_b weight+ CP_c weight)/3
res = (CP_a weight + CP_b weight+ CP_c weight)%3
if(res= =0)
   the affine merge candidate weight = weight
else
   the affine merge candidate weight = round(CP_a weight + CP_b weight+ CP_c
weight)/3 towards to equal weight
```

Similarly, the above rules may also be applied to a constructed affine merge candidate with 4 or more CPs, and to the determination of weight index.

According to some embodiments of the present disclosure, methods for using BWA weight for zero MV candidates are also provided. As noted above, after inherited affine merge candidates and constructed affine merge candidates are inserted into the affine merge candidate list (if the candidate list is not full), the candidate list will be filled with zero MVs until it is full. Consistent with some embodiments of the present disclosure, the candidate list can be filled with zero MVs with different BWA weights so that the filled zero MV candidates can provide different predictors.

For example, the order of weights of zero MVs to be filled in the candidate list can be {4,4}/8, {5,3}/8, {3,5}/8, {-2, 10}/8, {10, -2}/8. After inherited affine merge candidates and constructed affine merge candidates are derived, if the candidate list is not full, the zero MV with equal weight, {4,4}/8, can be inserted first. If the list is still not full, the zero MV with weight of {5,3}/8 can be inserted. After that, if the list is still not full, zero MVs with weights of {3,5}/8, {-2,10}/8 and {10,-2}/8 can be inserted until the list is full. If after zero MVs with all the weights are inserted, the candidate list is still not full, then the zero MVs with different reference indices can be inserted.

In VVC, there can be several constructed affine merge candidates. The order of the control point set/combination of the candidates is as follows: {$CP_1$, $CP_2$, $CP_3$}, {$CP_1$, $CP_2$, $CP_4$}, {$CP_1$, $CP_3$, $CP_4$}, {$CP_2$, $CP_3$, $CP_4$}, {$CP_1$, $CP_2$}, {$CP_1$, $CP_3$}. The encoder and decoder can check from the first combination to the last one. If the combination is available, then it can be put into the candidate list. If the combination is not available, the next combination can be checked. The index of the candidate selected in the candidate list can be indicated in the bitstream with a variable length code. The smaller index can be coded with a shorter length code. So the order of the candidate in the list can impact the coding efficiency. The fixed order of constructed affine merge candidates may not be optimized for each video sequence.

To address the above described problems, an adaptive order of merge candidates can be implemented. For example, the weights of the CPs in the combinations are checked. According to the check results, the order of each combination can be determined.

In some embodiments of the present disclosure, the combination in which all the CPs has the same weight or weight index is assigned the highest priority, and is placed first in the list. The combination in which CPs have the most diverse weights or weight indices has a lower priority, and is placed later in the list. In some embodiments of the present disclosure, the CPs can be classified into different classes according to the CP weights. The combination in which all the CPs fall within the same class can be assigned the highest priority, and can be placed first in the list. The combination in which CPs are in the most diverse classes can be assigned a lower priority and placed later in the list.

Based on the above, the more consistent the weights of the CPs in the combination is, the higher priority the combination has. For example, for combinations {$CPMV_1$, $CPMV_2$, $CPMV_3$} and {$CPMV_1$, $CPMV_2$, $CPMV_4$}. If $CP_1$, $CP_2$ and $CP_3$ have the same weight or weight index or belong to the same class, $CP_4$ has a different weight or weight index or belongs to a different class, then {CPMV$_1$, CPMV$_2$, CPMV$_3$} can be assigned a higher priority. That is, in the list, {CPMV$_1$, CPMV$_2$, CPMV$_3$} comes before {CPMV$_1$, CPMV$_2$, CPMV$_4$}. Alternatively, if the weights or weight indices or corresponding classes of CP$_1$, CP$_2$ and CP$_3$ are all different, but the weight or weight index or corresponding class of CP$_4$ is the same as that of CP$_1$, then {CPMV$_1$, CPMV$_2$, CPMV$_4$} is less diverse and can be assigned a higher priority. That is, in the list, {CPMV$_1$, CPMV$_2$, CPMV$_4$} comes before {CPMV$_1$, CPMV$_2$, CPMV$_3$}. If two combinations have the same level of diversity in terms of weight or weight index or class, then a default order can be assigned to these two combination.

In VVC, the constructed affine candidate refers to a candidate that is constructed by combining the neighboring motion information of each control point. The following combinations of control points are used to construct an affine merge candidate in order: {CP$_1$, CP$_2$, CP$_3$}, {CP$_1$, CP$_2$, CP$_4$}, {CP$_1$, CP$_3$, CP$_4$}, {CP$_2$, CP$_3$, CP$_4$}, {CP$_1$, CP$_2$}, {CP$_1$, CP$_3$}. The encoder and decoder can check the availability of each combination. If it is available, then the constructed affine merge candidate can be put into the candidate list. If the combination is not available, the availability of the next combination can be checked. In existing techniques, the availability condition focuses on whether the neighboring CU is inter coded or not. The BWA weight is not considered.

Consistent with some embodiments of the present disclosure, a new availability condition can be applied. The weight or weight index of each CP in a combination can be checked. The availability of the combination can be determined according to the checking results.

In some embodiments, if weights of two CPs in the combination have different signs, the combination can be set as an unavailable combination. For example, in the combination {CP$_1$, CP$_2$, CP$_3$}, if the weight of CP$_1$ is (−2, 10) and the weight of CP$_2$ is (10, −2), then this combination can be set as unavailable. As another example, in the combination {CP$_1$, CP$_2$, CP$_3$}, if the weight of CP$_1$ is (−2, 10) and the weight of CP$_2$ is (4,4), then this combination can be set as unavailable.

In VVC, BWA weight is applied at CU or PU level. That means each pixel within one CU or PU has the same weight in the prediction process. However, in the affine motion prediction, a sub-block-based motion compensation can be applied. The motion vector of each sub-block within the current CU can be derived by the motion vectors of the control points of the current CU. Then the motion compensation interpolation filters are applied to generate the predictor of each sub-block with the derived motion vector. In order to match the motion vector and BWA weight, the sub-block level weight can be derived according to some embodiments of the present disclosure.

In some embodiments, the weight of each sub-block within the current CU or PU can be derived by the weights of the control points of the current CU or PU. Therefore, each sub-block may have different weights.

In some embodiments, the weight of each pixel w$_{x,y}$ can be interpolated from the weights of CPs, w$_{cp0}$, w$_{cp1}$ and w$_{cp2}$, where (x,y) indicates the coordinates of each pixel. Various interpolation filters may be used, which is not limited here. To simplify the interpolation process, weights may be derived at a sub-block level. For example, (x,y) may be the center coordinates of each sub-block. Further, the sub-block size may be the same as that used in affine motion prediction.

Figure 9A:
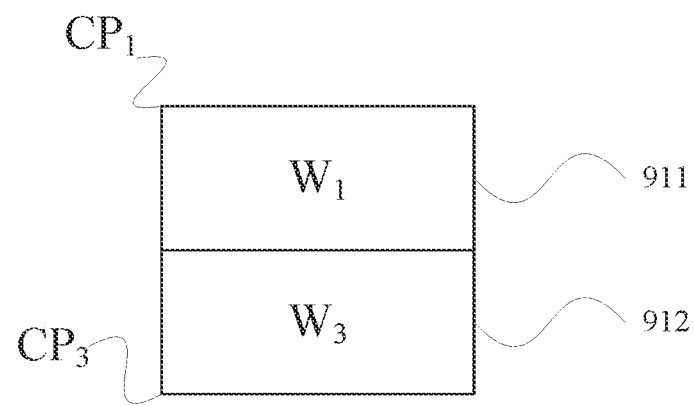
FIG. 9A is a schematic diagram illustrating horizontal sub-block partitioning for a coding unit with two control points, according to some embodiments of the present disclosure.
Figure 9B:
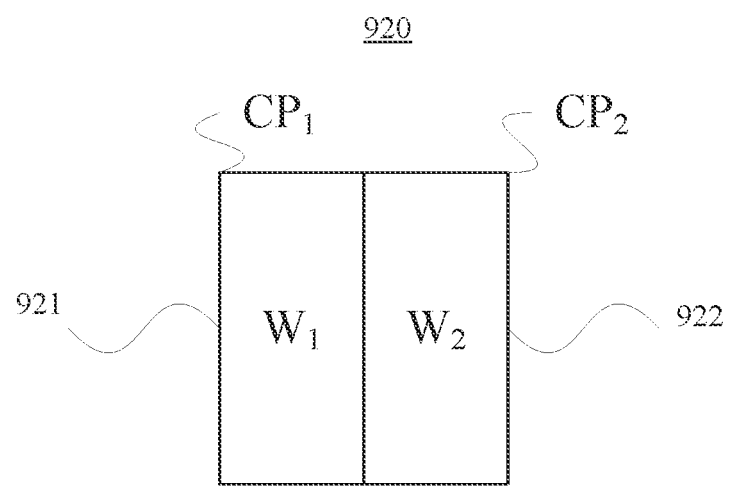
FIG. 9B is a schematic diagram illustrating vertical sub-block partitioning for a coding unit with two control points, according to some embodiments of the present disclosure.

In some embodiments of the present disclosure, a CU or PU can be split into, for example, 2 or 4 sub-blocks. For each sub-block, the weight of the control point which is contained in the sub-block can be used for the sub-block. For a sub-block having no control point in the control point combination of the current constructed affine merge candidate, a pre-defined rule can be used to derive a weight value. For example, as shown in FIG. 9A, for 2-CP combination {CP$_1$, CP$_3$}, the CU or PU 910 can be horizontally partitioned into two sub-blocks 911 and 912. The weight of CP$_1$, W1, can be used for the upper sub-block 911. The weight of CP$_3$, W3, can be used for the bottom sub-block 912. As another example, as shown in FIG. 9B, for 2-CP combination {CP$_1$, CP$_2$}, the CU or PU 920 can be vertically partitioned into two sub-blocks 921 and 922. The weight of CP$_1$ can be used for the left sub-block 921. The weight of CP$_2$ can be used for the right sub-block 922.

Figure 9C:
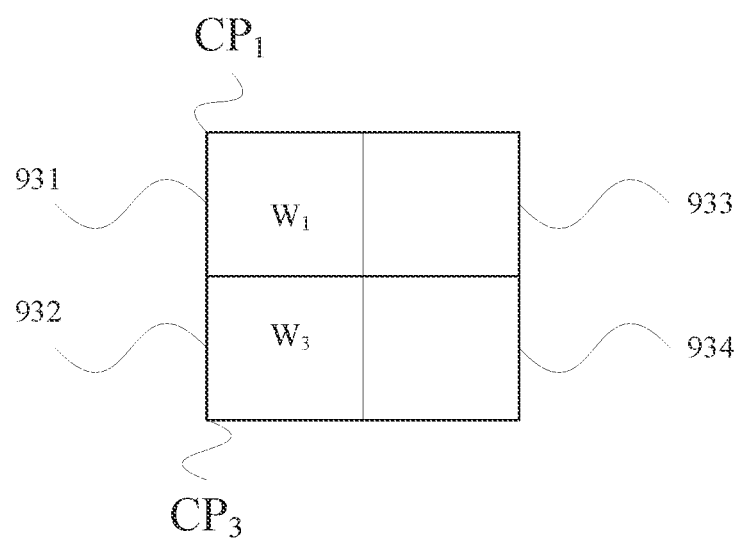
FIG. 9C is a schematic diagram illustrating sub-block partitioning into four sub-blocks for a coding unit with two control points, according to some embodiments of the present disclosure.
Figure 9D:
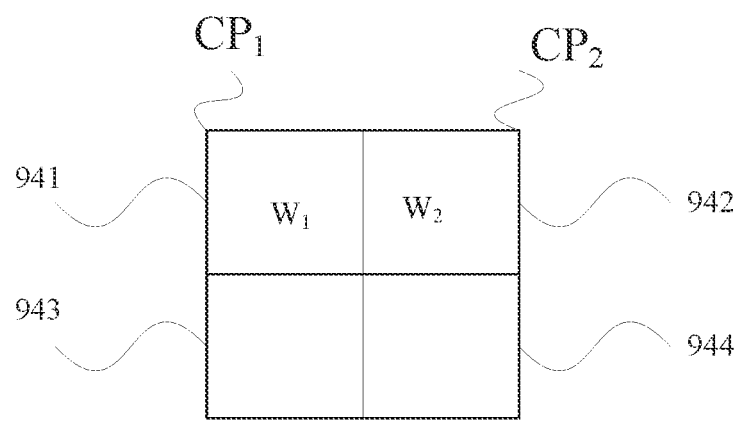
FIG. 9D is a schematic diagram illustrating sub-block partitioning into four sub-blocks for a coding unit with two control points, according to some embodiments of the present disclosure.

Alternatively, for 2-CP combination {CP$_1$, CP$_3$}, as shown in FIG. 9C, the CU or PU 930 can be partitioned into four sub-blocks 931, 932, 933, and 934. The weight of CP$_1$ can be used for the top-left sub-block 931. The weight of CP$_3$ can be used for the bottom-left sub-block 932. The weight of the top-right sub-block 933 may be derived from the weight of CP$_1$, or set as default value. The weight of the bottom-right sub-block 934 may be derived from the weight of CP$_3$, or set as default value. Similarly, for 2 CPs combination {CP$_1$, CP$_2$}, as shown in FIG. 9D, the CU or PU 940 can be partitioned into four sub-blocks 941, 942, 943, and 944. The weight of CP$_1$ can be used for the top-left sub-block 941. The weight of CP$_2$ can be used for the top-right sub-block 942. The weight of the bottom-left sub-block 943 may be derived from the weight of CP$_1$, or set as default value. The weight of the bottom-right sub-block 944 may be derived from the weight of CP$_2$, or set as default value.

Figure 10A:
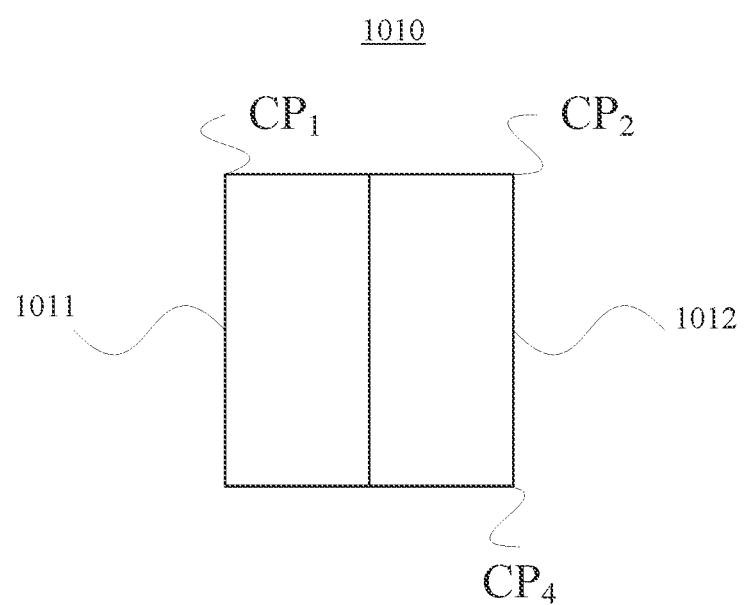
FIG. 10A is a schematic diagram illustrating vertical sub-block partitioning for a coding unit with three control points, according to some embodiments of the present disclosure.
Figure 10B:
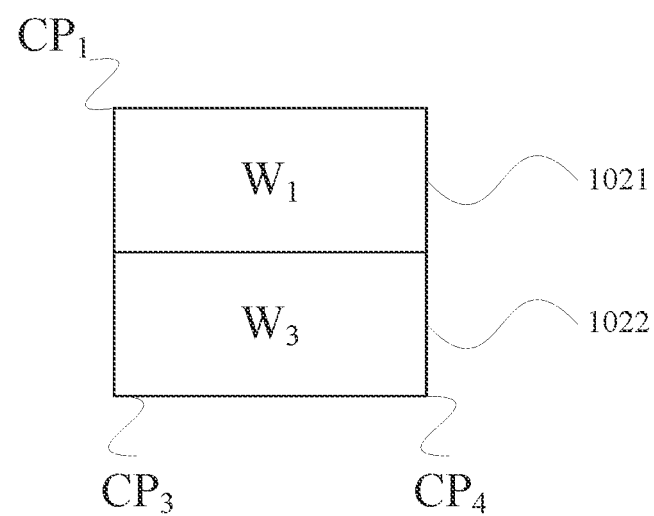
FIG. 10B is a schematic diagram illustrating horizontal sub-block partitioning for a coding unit with three control points, according to some embodiments of the present disclosure.
Figure 10C:
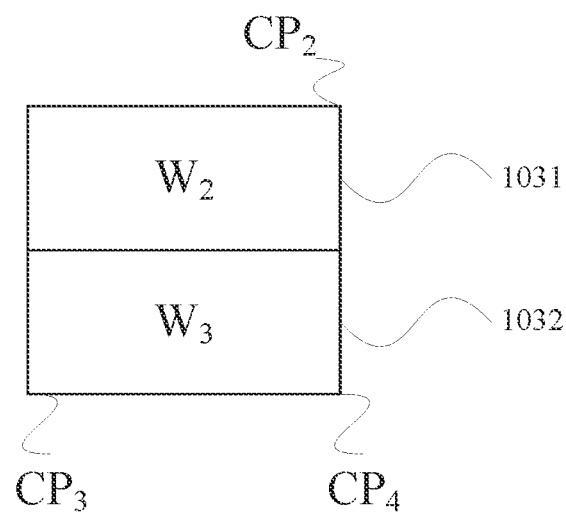
FIG. 10C is a schematic diagram illustrating horizontal sub-block partitioning for a coding unit with three control points, according to some embodiments of the present disclosure.
Figure 10D:
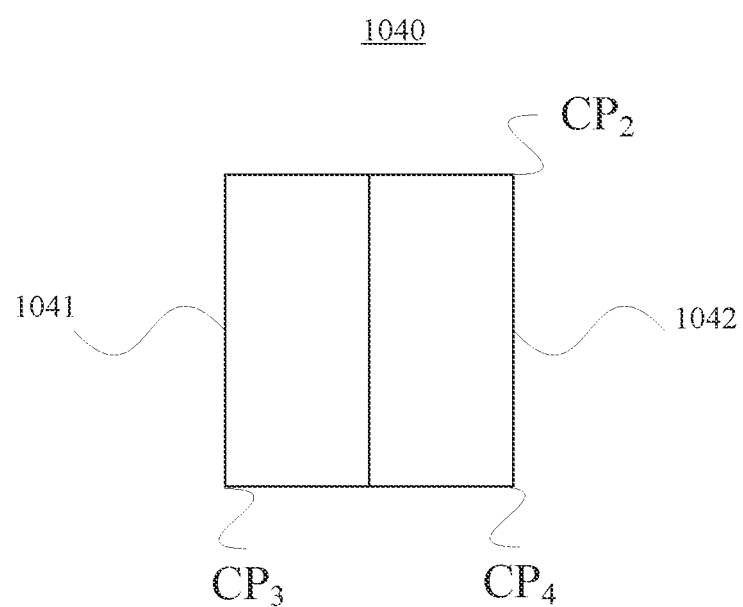
FIG. 10D is a schematic diagram illustrating vertical sub-block partitioning for a coding unit with three control points, according to some embodiments of the present disclosure.

Exemplary partitions with respect to three CPs are further provided below. As shown in FIG. 10A, for the 3-CP combination {CP$_1$, CP$_2$, CP$_4$}, the CU or PU 1010 can be vertically partitioned into two sub-blocks 1011 and 1012. The weight of CP$_1$ can be used for the left sub-block 1011. The weight of CP$_2$ can be used for the right sub-block 1012. For the 3-CP combination {CP$_1$, CP$_3$, CP$_4$}, as shown in FIG. 10B, the CU or PU 1020 can be horizontally partitioned into two sub-blocks 1021 and 1022. The weight of CP$_1$ can be used for the upper sub-block 1021. The weight of CP$_3$ can be used for the bottom sub-block 1022. For the 3-CP combination {CP$_2$, CP$_3$, CP$_4$}, as shown in FIG. 10C, the CU or PU 1030 can be partitioned horizontally into sub-blocks 1031 and 1032. The weight of CP$_2$ can be used for the top sub-block 1031. The weight of CP$_3$ can be used for the bottom sub-block 1032. Alternatively, as shown in FIG. 10D, the CU or PU 1040 can be vertically portioned into sub-blocks 1041 and 1042. The weight of CP$_2$ can be used for the right sub-block 1042. The weight of CP$_3$ can be used for the left sub-block 1041.

Figure 10E:
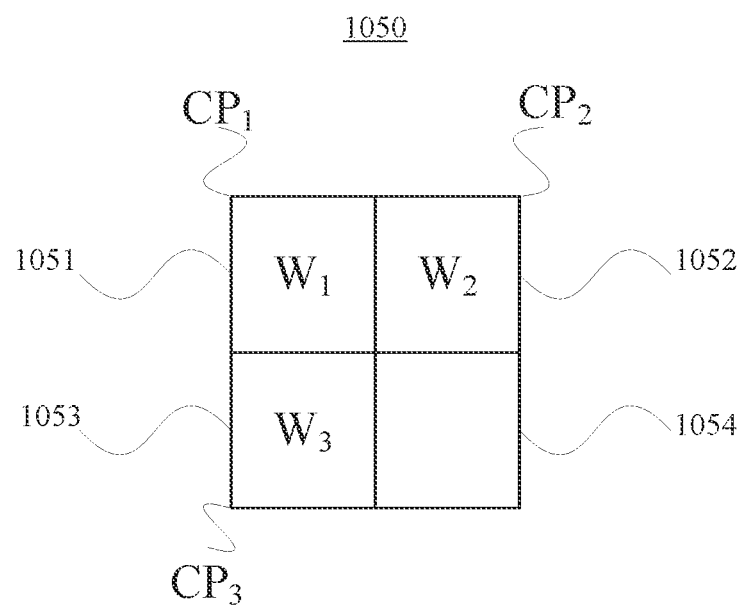
FIG. 10E is a schematic diagram illustrating sub-block partitioning into four sub-blocks for a coding unit with three control points, according to some embodiments of the present disclosure.

The CU or PU can further be portioned to 4 sub-blocks. As shown in FIG. 10E, for the 3 CP combination {CP$_1$, CP$_2$, CP$_3$}, the CU or PU 1050 can be partitioned into four sub-blocks 1051, 1052, 1053, and 1054. The weight of CP$_1$ can be used for the top-left sub-block 1051. The weight of CP$_2$ can be used for the top-right sub-block 1052. The weight of CP$_3$ can be used for the bottom-left sub-block 1053. The weight of the bottom-right sub-block 1054 may be set as one of the following: the average value of the three weights of CP$_1$, CP$_2$, and CP$_3$; the average value of the weight of CP$_2$ and the weight of CP$_3$; the middle value of the three weights of CP$_1$, CP$_2$, and CP$_3$; one of the three weights of CP$_1$, CP$_2$, and CP$_3$ which has the smallest difference from the equal weight; one of the weight of $CP_2$ and the weight of $CP_3$ which has a smaller difference from the equal weight; the equal weight; or another default value.

Figure 10F:
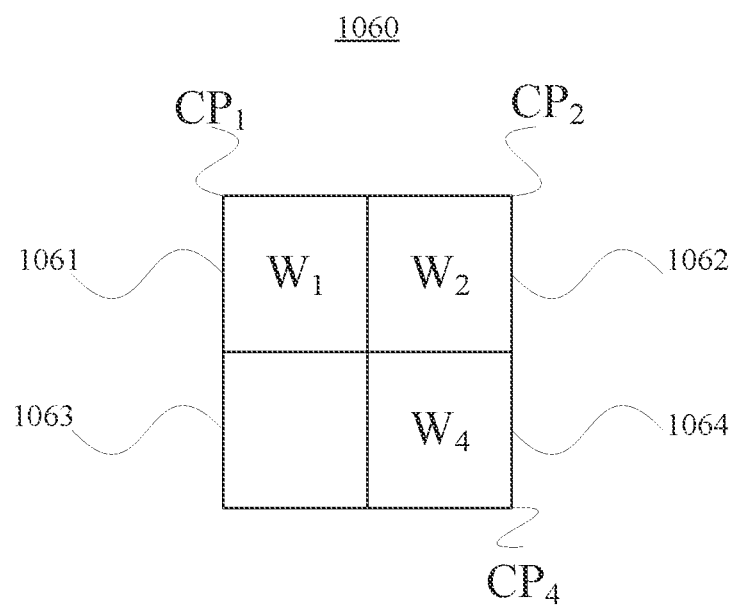
FIG. 10F is a schematic diagram illustrating sub-block partitioning into four sub-blocks for a coding unit with three control points, according to some embodiments of the present disclosure.

As shown in FIG. 10F, for the 3 CP combination $\{CP_1, CP_2, CP_4\}$, the CU or PU 1060 can be partitioned into four sub-blocks 1061, 1062, 1063, and 1064. The weight of $CP_1$ can be used for the top-left sub-block 1061. The weight of $CP_2$ can be used for the top-right sub-block 1062. The weight of $CP_4$ can be used for the bottom-right sub-block 1064. The weight of the bottom-left sub-block 1063 may be set as one of the following: the average value of all three weights; the average value of the weight of $CP_1$ and the weight of $CP_4$; the middle value of the three weights; one of the three weights of $CP_1$, $CP_2$, $CP_4$ which has the smallest difference from the equal weight; one of the weight of $CP_1$ and the weight of $CP_4$ which has a smaller difference from the equal weight; the equal weight; or another default value.

Figure 10G:
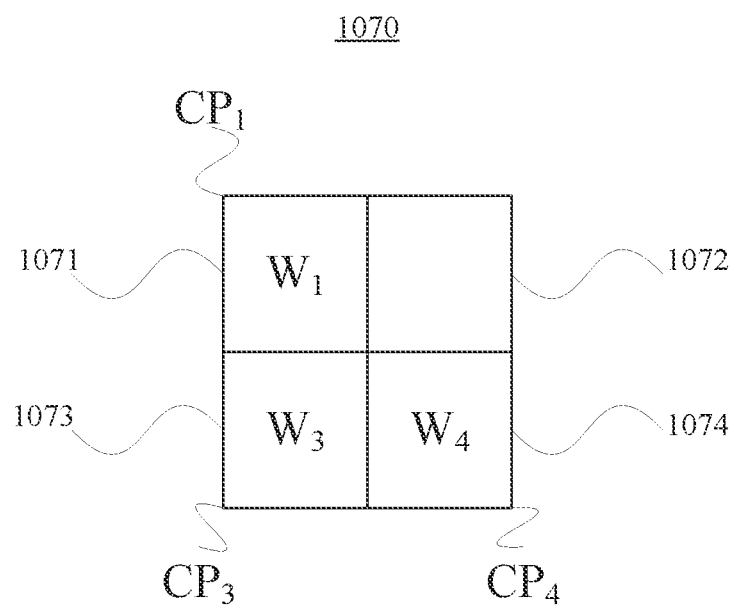
FIG. 10G is a schematic diagram illustrating sub-block partitioning into four sub-blocks for a coding unit with three control points, according to some embodiments of the present disclosure.

As shown in FIG. 10G, for the 3 CP combination $\{CP_1, CP_3, CP_4\}$, the CU or PU 1080 can be partitioned into four sub-blocks 1071, 1072, 1073, and 1074. The weight of $CP_1$ can be used for the top-left sub-block 1071, the weight of $CP_3$ can be used for the bottom-left sub-block 1073, and the weight of $CP_4$ can be used for the bottom-right sub-block 1074. The weight of the top-right sub-block 1072 may be set as one of the following: the average value of all three weights; the average value of the weight of $CP_1$ and the weight of $CP_4$; the middle value of the three weights; one of the three weights of $CP_1$, $CP_3$, $CP_4$ which has the smallest difference from the equal weight; one of the weight of $CP_1$ and the weight of $CP_4$ which has the smaller difference from the equal weight; the equal weight; or another default value.

Figure 10H:
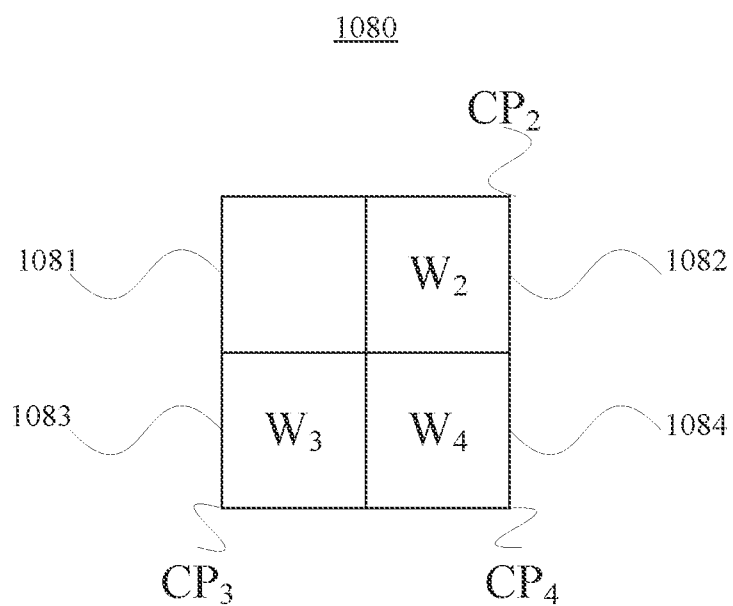
FIG. 10H is a schematic diagram illustrating sub-block partitioning into four sub-blocks for a coding unit with three control points, according to some embodiments of the present disclosure.

As shown in FIG. 10H, for the 3 CP combination $\{CP_2, CP_3, CP_4\}$, the CU or PU 1080 can be partitioned into four sub-blocks 1081, 1082, 1083, and 1084. The weight of $CP_2$ can be used for the top-right sub-block 1082. The weight of $CP_3$ can be used for the bottom-left sub-block 1083. The weight of $CP_4$ can be used for the bottom-right sub-block 1084. The weight of the top-left sub-block 1081 may be set as one of the following: the average value of all three weights; the average value of the weight of $CP_2$ and the weight of $CP_3$; the middle value of the three weights of control points; one of the three weights of $CP_2$, $CP_3$, $CP_4$ which has the smallest difference from the equal weight; one of the weight of $CP_2$ and the weight of $CP_3$ which has a smaller difference from the equal weight; the equal weight; or another default value.

Figure 11:
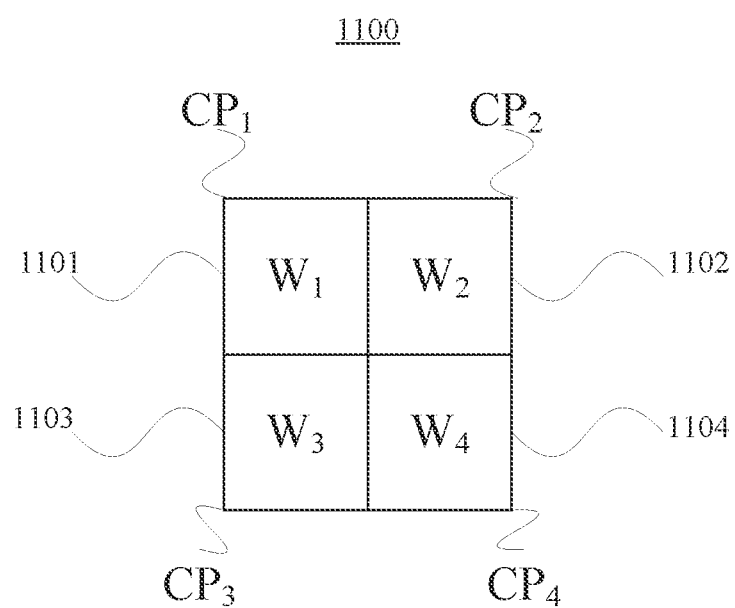
FIG. 11 is a schematic diagram illustrating sub-block partitioning into four sub-blocks for a coding unit with four control points, according to some embodiments of the present disclosure.

Exemplary partitions with respect to 4 CPs are further provided below. As shown in FIG. 11, for the combination $\{CP_1, CP_2, CP_3, CP_4\}$, the CU or PU 1100 can be partitioned into four sub-blocks 1101, 1102, 1103, and 1104. The weight of $CP_1$ can be used for the top-left sub-block 1101. The weight of $CP_2$ can be used for the top-right sub-block 1102. The weight of $CP_3$ can be used for the bottom-left sub-block 1103. The weight of $CP_4$ can be used for the bottom-right sub-block 1104.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Some embodiments of the present disclosure may further be described using the following clauses:

1. A method for processing video data, the method comprising:
determining a weight for at least one of an inherited affine merge candidate, a constructed affine merge candidate, or a zero motion vector of a coding unit; and
bi-predicting the coding unit based on the determined weight.

2. The method according to clause 1, wherein the weight is determined based on a weight index signaled in a bitstream.

3. The method according to clause 1, wherein the determined weight comprises a weight for the constructed affine merge candidate, and the method further comprises:
in response to a plurality of control points associated with the constructed affine merge candidate having one or more weights, determining the weight for the constructed affine merge candidate based on a weight associated with a top left control point or a weight associated with a top right control point.

4. The method according to clause 1 or 3, wherein the determined weight comprises a weight for the constructed affine merge candidate, and the method further comprises:
in response to a plurality of control points associated with the constructed affine merge candidate having a same weight, determining the weight of the plurality of control points as a weight of the constructed affine merge candidate; or in response to the plurality of control points having different weights, determining a default value as the weight of the constructed affine merge candidate.

5. The method according to clause 1 or 3, wherein the determined weight comprises a weight for the constructed affine merge candidate, and the method further comprises:

determining, among weights of a plurality of control points corresponding to the constructed affine merge candidate, a weight used by most of the plurality of control points; and setting the determined weight as the weight of the constructed affine merge candidate.

6. The method according to clause 1 or 3, wherein the determined weight comprises a weight for the constructed affine merge candidate, and the method further comprises:

determining differences between an equal weight and weights of the plurality of control points, respectively;

determining, among the plurality of control points, a first control point with a weight having a smallest difference from the equal weight; and setting the weight of the first control point as the weight of the constructed affine merge candidate.

7. The method according to clause 1 or 3, wherein the determined weight comprises a weight for the constructed affine merge candidate, and the method further comprises:

determining an average weight for a plurality of control points corresponding to the constructed affine merge candidate; and setting the average weight as the weight of the constructed affine merge candidate.

8. The method according to any of clauses 1-7, wherein the bi-predicting the coding unit based on the determined weight comprises processing the video data using an affine merge mode, and the method further comprises:

inserting, when constructing an affine merge candidate list, a zero motion vector with equal weight into the affine merge candidate list before inserting a zero motion vector with unequal weight.

9. The method according to any of clauses 1-7, wherein the bi-predicting the coding unit based on the determined weight comprises processing the video data using an affine merge mode, and the method further comprises:

determining, when constructing an affine merge candidate list, an order of a plurality of constructed affine merge candidates based on weights of control points corresponding to each of the plurality of constructed affine merge candidates, wherein a constructed affine merge candidate having control points with less diverse weights is assigned a higher priority than a constructed affine merge candidate having control points with more diverse weights.

10. The method of clause 9, wherein the determining the order of the plurality of constructed affine merge candidates comprises:

in response to weights of control points corresponding to each of two constructed merge candidates having a same level of diversity, using a default order for the two constructed merge candidates.

11. The method of clause 9 or 10, further comprising:

determining an availability of a first constructed affine merge candidate based on weights of control points corresponding to the first constructed affine merge candidate; and in response to a determination that the first constructed affine merge candidate is available, adding the first constructed affine merge candidate to the affine merge candidate list.

12. The method of clause 11, wherein the determining the availability of the first constructed affine merge candidate comprises:

determining whether weights of two control points corresponding to the first constructed affine merge candidate have different signs; and in response to a determination that the weights of the two control points corresponding to the first constructed affine merge candidate have different signs, determining that the first constructed affine merge candidate is not available.

13. A method for processing video data, the method comprising:

determining a weight of a first sub-block within a coding unit, based on weights of control points of the coding unit;

bi-predicting the first sub-block based on the determined weight.

14. The method according to clause 13, wherein the determining the weight of the first sub-block within the coding unit comprises:

in response to the first sub-block comprising one of the control points, using a weight of the one of the control points as the weight of the first sub-block, or in response to the first sub-block not comprising the control points, determining the weight of the first sub-block according to a pre-defined rule.

15. The method according to clause 13, wherein:

the coding unit is partitioned into four sub-blocks and has two control points; and the determining the weight of the first sub-block within the coding unit comprises:

in response to the first sub-block comprising one of the two control points, using a weight of the one of the two control points as the weight of the first sub-block, or in response to the first sub-block not comprising the two control points, setting the weight of the first sub-block to be one of:

a weight of one of the two control points with a shorter distance to the first sub-block, or a default value.

16. The method according to clause 13, wherein:

the coding unit is partitioned into two sub-blocks and has three control points; and the determining the weight of the first sub-block within the coding unit comprises:

in response to the first sub-block including only one of the three control points, using a weight of the one of the control points as the weight of the first sub-block, or in response to the first sub-block comprising at least two of the three control points, using a default value or a weight of one of the two control points as the weight of the first sub-block.

17. The method according to clause 13, wherein:

the coding unit is partitioned into four sub-blocks and has three control points, the three control points having a first, a second, and a third weight, respectively; and the determining the weight of the first sub-block within the coding unit comprises:

in response to the first sub-block comprising at least one of the three control points, using a weight of the one of the control points as the weight of the first sub-block, or in response to the sub-block not comprising the three control points, setting the weight of the first sub-block to be one of:

an average value of the first, second, and third weights, a middle value of the first, second, and third weights, an equal weight of the coding unit, one of the first, second, and third weights which has a smallest difference from the equal weight,
one of the first and second weights which has a smaller difference from the equal weight, or
a default value.

18. A video processing apparatus, comprising:
a memory storing instructions; and
a processor configured to execute the instructions to cause the apparatus to:
determine a weight for at least one of an inherited affine merge candidate, a constructed affine merge candidate, or a zero motion vector of a coding unit; and
bi-predict the coding unit based on the determined weight.

19. The apparatus according to clause 18, wherein the weight is determined based on a weight index signaled in a bitstream.

20. The apparatus according to clause 18, wherein the determined weight comprises a weight for the constructed affine merge candidate, and the processor is further configured to execute the instructions to cause the apparatus to perform:
if a plurality of control points associated with the constructed affine merge candidate have one or more weights, determining the weight for the constructed affine merge candidate based on a weight associated with a top left control point or a weight associated with a top right control point.

21. The apparatus according to clause 18 or 20, wherein the determined weight comprises a weight for the constructed affine merge candidate, and the processor is further configured to execute the instructions to cause the apparatus to perform:
if a plurality of control points associated with the constructed affine merge candidate have a same weight, determining the weight of the plurality of control points as a weight of the constructed affine merge candidate; or
if the plurality of control points have different weights, determining a default value as the weight of the constructed affine merge candidate.

22. The apparatus according to clause 18 or 20, wherein the determined weight comprises a weight for the constructed affine merge candidate, and the processor is further configured to execute the instructions to cause the apparatus to perform:
determining, among weights of a plurality of control points corresponding to the constructed affine merge candidate, a weight used by most of the plurality of control points; and
setting the determined weight as the weight of the constructed affine merge candidate.

23. The apparatus according to clause 18 or 20, wherein the determined weight comprises a weight for the constructed affine merge candidate, and the processor is further configured to execute the instructions to cause the apparatus to perform:
determining differences between an equal weight and weights of the plurality of control points, respectively;
determining, among the plurality of control points, a first control point with a weight having a smallest difference from the equal weight; and
setting the weight of the first control point as the weight of the constructed affine merge candidate.

24. The apparatus according to clause 18 or 20, wherein the determined weight comprises a weight for the constructed affine merge candidate, and the processor is further configured to execute the instructions to cause the apparatus to perform:
determining an average weight for a plurality of control points corresponding to the constructed affine merge candidate; and
setting the average weight as the weight of the constructed affine merge candidate.

25. The apparatus according to any of clauses 18-24, wherein the bi-predicting the coding unit based on the determined weight comprises processing the video data using an affine merge mode, and the processor is further configured to execute the instructions to cause the apparatus to perform:
inserting, when constructing an affine merge candidate list, a zero motion vector with equal weight into the affine merge candidate list before inserting a zero motion vector with unequal weight.

26. The apparatus according to any of clauses 18-24, wherein the bi-predicting the coding unit based on the determined weight comprises processing the video data using an affine merge mode, and the processor is further configured to execute the instructions to cause the apparatus to perform:
determining, when constructing an affine merge candidate list, an order of a plurality of constructed affine merge candidates based on weights of control points corresponding to each of the plurality of constructed affine merge candidates, wherein
a constructed affine merge candidate having control points with less diverse weights is assigned a higher priority than a constructed affine merge candidate having control points with more diverse weights.

27. The apparatus of clause 26, wherein in determining the order of the plurality of constructed affine merge candidates, the processor is further configured to execute the instructions to cause the apparatus to perform:
in response to weights of control points corresponding to each of two constructed merge candidates having a same level of diversity, using a default order for the two constructed merge candidates.

28. The apparatus of clause 26 or 27, wherein the processor is further configured to execute the instructions to cause the device to perform:
determining an availability of a first constructed affine merge candidate based on weights of control points corresponding to the first constructed affine merge candidate; and
if the first constructed affine merge candidate is available, adding the first constructed affine merge candidate to the affine merge candidate list.

29. The apparatus of clause 28, wherein in determining the availability of the first constructed affine merge candidate, the processor is further configured to execute the instructions to cause the apparatus to perform:
determining whether weights of two control points corresponding to the first constructed affine merge candidate have different signs; and
if the weights of the two control points corresponding to the first constructed affine merge candidate have different signs, determining that the first constructed affine merge candidate is not available.

30. A video processing apparatus, comprising:
a memory storing instructions; and
a processor configured to execute the instructions to cause the apparatus to:

determine a weight of a first sub-block within a coding unit, based on weights of control points of the coding unit;

bi-predict the first sub-block based on the determined weight.

31. The apparatus according to clause 30, wherein in determining the weight of the first sub-block within the coding unit, the processor is further configured to execute the instructions to cause the apparatus to perform:

if the first sub-block comprises one of the control points, using a weight of the one of the control points as the weight of the first sub-block, or if the first sub-block does not comprise the control points, determining the weight of the first sub-block according to a pre-defined rule.

32. The apparatus according to clause 30, wherein:

the coding unit is partitioned into four sub-blocks and has two control points; and in determining the weight of the first sub-block within the coding unit, the processor is further configured to execute the instructions to cause the apparatus to perform:

in response to the first sub-block comprising one of the two control points, using a weight of the one of the two control points as the weight of the first sub-block, or in response to the first sub-block not comprising the two control points, setting the weight of the first sub-block to be one of:

a weight of one of the two control points with a shorter distance to the first sub-block, or a default value.

33. The apparatus according to clause 30, wherein:

the coding unit is partitioned into two sub-blocks and has three control points; and in determining the weight of the first sub-block within the coding unit, the processor is further configured to execute the instructions to cause the apparatus to perform:

in response to the first sub-block including only one of the three control points, using a weight of the one of the control points as the weight of the first sub-block, or in response to the first sub-block comprising at least two of the three control points, using a default value or a weight of one of the two control points as the weight of the first sub-block.

34. The apparatus according to clause 30, wherein:

the coding unit is partitioned into four sub-blocks and has three control points, the three control points having a first, a second, and a third weight, respectively; and in determining the weight of the first sub-block within the coding unit, the processor is further configured to execute the instructions to cause the apparatus to perform:

in response to the first sub-block comprising at least one of the three control points, using a weight of the one of the control points as the weight of the first sub-block, or in response to the sub-block not comprising the three control points, setting the weight of the first sub-block to be one of:

an average value of the first, second, and third weights, a middle value of the first, second, and third weights, an equal weight of the coding unit, one of the first, second, and third weights which has a smallest difference from the equal weight, one of the first and second weights which has a smaller difference from the equal weight, or a default value.

35. A non-transitory computer-readable medium storing a set of instructions that is executable by one or more processors of a video processing device to cause the device to perform a method comprising:

determining a weight for at least one of an inherited affine merge candidate, a constructed affine merge candidate, or a zero motion vector of a coding unit; and bi-predicting the coding unit based on the determined weight.

36. The non-transitory computer-readable medium according to clause 35, wherein the weight is determined based on a weight index signaled in a bitstream.

37. The non-transitory computer-readable medium according to clause 35, wherein the determined weight comprises a weight for the constructed affine merge candidate, and the set of instructions is executable by the one or more processors of the device to cause the device to further perform:

if a plurality of control points associated with the constructed affine merge candidate have one or more weights, determining the weight for the constructed affine merge candidate based on a weight associated with a top left control point or a weight associated with a top right control point.

38. The non-transitory computer-readable medium according to clause 35 or 37, wherein the set of instructions is executable by the one or more processors of the device to cause the device to further perform:

if a plurality of control points associated with the constructed affine merge candidate have a same weight, determining the weight of the plurality of control points as the weight of the constructed affine merge candidate; and if the plurality of control points have different weights, determining a default value as the weight of the constructed affine merge candidate.

39. The non-transitory computer-readable medium according to clause 35 or 37, wherein the set of instructions is executable by the one or more processors of the device to cause the device to further perform:

determining, among weights of a plurality of control points corresponding to the constructed affine merge candidate, a weight used by most of the plurality of control points; and setting the determined weight as the weight of the constructed affine merge candidate.

40. The non-transitory computer-readable medium according to clause 35 or 37, wherein the set of instructions is executable by the one or more processors of the device to cause the device to further perform:

determining differences between an equal weight and weights of the plurality of control points, respectively;

determining, among the plurality of control points, a first control point with a weight having a smallest difference from the equal weight; and setting the weight of the first control point as the weight of the constructed affine merge candidate.

41. The non-transitory computer-readable medium according to clause 35 or 37, wherein the set of instructions is executable by the one or more processors of the device to cause the device to further perform:

determining an average weight for a plurality of control points corresponding to the constructed affine merge candidate; and setting the average weight as the weight of the constructed affine merge candidate.

42. The non-transitory computer-readable medium according to any of clauses 35-41, wherein the set of instructions is executable by the one or more processors of the device to cause the device to further perform:

inserting, when constructing an affine merge candidate list, a zero motion vector with equal weight into the affine merge candidate list before inserting a zero motion vector with unequal weight.

43. The non-transitory computer-readable medium according to any of clauses 35-41, wherein the set of instructions is executable by the one or more processors of the device to cause the device to further perform:

determining, when constructing an affine merge candidate list, an order of a plurality of constructed affine merge candidates based on weights of control points corresponding to each of the plurality of constructed affine merge candidates, wherein
a constructed affine merge candidate having control points with less diverse weights is assigned a higher priority than a constructed affine merge candidate having control points with more diverse weights.

44. The non-transitory computer-readable medium according to clause 43, wherein the set of instructions is executable by the one or more processors of the device to cause the device to further perform:

if weights of control points corresponding to each of two constructed merge candidates have a same level of diversity, using a default order for the two constructed merge candidates.

45. The non-transitory computer-readable medium according to clause 43 or 44, wherein the set of instructions is executable by the one or more processors of the device to cause the device to further perform:

determining an availability of a first constructed affine merge candidate based on weights of control points corresponding to the first constructed affine merge candidate; and if the first constructed affine merge candidate is available, adding the first constructed affine merge candidate to the affine merge candidate list.

46. The non-transitory computer-readable medium according to clause 45, wherein the set of instructions is executable by the one or more processors of the device to cause the device to further perform:

determining whether weights of two control points corresponding to the first constructed affine merge candidate have different signs; and if the weights of the two control points corresponding to the first constructed affine merge candidate have different signs, determining that the first constructed affine merge candidate is not available.

47. A non-transitory computer-readable medium storing a set of instructions that is executable by one or more processors of a video processing device to cause the device to perform a method comprising:

determining a weight of a first sub-block within a coding unit, based on weights of control points of the coding unit;

bi-predicting the first sub-block based on the determined weight.

48. The non-transitory computer-readable medium according to clause 47, wherein the determining the weight of the first sub-block within the coding unit comprises:

if the first sub-block comprises one of the control points, using a weight of the one of the control points as the weight of the first sub-block; or if the first sub-block does not comprise the control points, determining the weight of the first sub-block according to a pre-defined rule.

49. The non-transitory computer-readable medium according to clause 47, wherein the set of instructions is executable by the one or more processors of the device to cause the device to further perform:

partitioning the coding unit into four sub-blocks, wherein the coding unit has two control points; and the determining the weight of the first sub-block within the coding unit comprises:
if a sub-block comprises one of the two control points, using a weight of the one of the two control points as the weight of the first sub-block, or
if the first sub-block does not comprise the two control points, setting the weight of the first sub-block to be one of:
a weight of one of the two control points with a shorter distance to the first sub-block, or
a default value.

50. The non-transitory computer-readable medium according to clause 47, wherein the set of instructions is executable by the one or more processors of the device to cause the device to further perform:

partitioning the coding unit into two sub-blocks, wherein the coding unit has three control points; and the determining the weight of the sub-block within the coding unit comprises:
if the first sub-block includes only one of the three control points, using a weight of the one of the control points as the weight of the first sub-block, or
if the first sub-block comprises two of the three control points, using a default value or a weight of one of the two control points as the weight of the first sub-block.

51. The non-transitory computer-readable medium according to clause 47, wherein the set of instructions is executable by the one or more processors of the device to cause the device to further perform:

partitioning the coding unit into four sub-blocks, wherein the coding unit has three control points, the three control points having a first, a second, and a third weight; and the determining the weight of the first sub-block within the coding unit comprises:
if the first sub-block comprises at least one of the three control points, using a weight of the one of the control points as the weight of the first sub-block, or
if the first sub-block does not comprise the three control points, setting the weight of the first sub-block to be one of:
an average value of the first, second, and third weights,
a middle value of the first, second, and third weights,
an equal weight of the coding unit,
one of the first, second, and third weights which has a smallest difference from the equal weight,
one of the first and second weights which has a smaller difference from the equal weight, or
a default value.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation. The disclosed embodiments are not limited to the above described examples, but instead is defined by the appended claims in light of their full scope of equivalents.

What is claimed is:

1. A method for processing video data, the method comprising:
partitioning a coding unit into a plurality of sub-blocks, wherein the coding unit is associated with a first weight;
determining a second weight of a sub-block of the plurality of sub-blocks based on weights of control points, wherein the control points are neighboring corners of the coding unit; and
bi-predicting the sub-block based on the second weight.

2. The method according to claim 1, wherein the determining the second weight of the sub-block within the coding unit comprises:
in response to the sub-block comprising one of the control points, using a weight of the one of the control points as the second weight of the sub-block, or in response to the sub-block not comprising the control points, determining the second weight of the sub-block according to a pre-defined rule.

3. The method according to claim 1, wherein:
the coding unit is partitioned into four sub-blocks and has two control points; and
the determining the second weight of the sub-block within the coding unit comprises:
in response to the sub-block comprising one of the two control points, using a weight of the one of the two control points as the second weight of the sub-block, or
in response to the sub-block not comprising the two control points, setting the second weight of the sub-block to be one of:
a weight of one of the two control points with a shorter distance to the sub-block, or
a default value.

4. The method according to claim 1, wherein:
the coding unit is partitioned into two sub-blocks and has three control points; and
the determining the second weight of the sub-block within the coding unit comprises:
in response to the sub-block including only one of the three control points, using a weight of the one of the control points as the second weight of the sub-block, or
in response to the sub-block comprising at least two of the three control points, using a default value or a weight of one of the two control points as the second weight of the sub-block.

5. The method according to claim 1, wherein:
the coding unit is partitioned into four sub-blocks and has three control points, the three control points having a first control point weight, a second control point weight, and a third control point weight, respectively; and
the determining the second weight of the sub-block within the coding unit comprises:
in response to the sub-block comprising at least one of the three control points, using a weight of the one of the control points as the second weight of the sub-block, or
in response to the sub-block not comprising the three control points, setting the second weight of the sub-block to be one of:
an average value of the first control point weight, the second control point weight, and the third control point weight,
a middle value of the first control point weight, the second control point weight, and the third control point weight,
an equal weight of the coding unit,
one of the first control point weight, the second control point weight, and the third control point weight which has a smallest difference from the equal weight,
one of the first control point weight and second control point weight which has a smaller difference from the equal weight, or
a default value.

6. The method according to claim 1, wherein the coding unit has two control points, and
the partitioning a coding unit into a plurality of sub-blocks comprises:
partitioning the coding unit into two sub-blocks, wherein each sub-block includes one control point; and
the determining the second weight of the sub-block of the plurality of sub-blocks based on weights of control points comprises:
using a weight of the control point included in the sub-block as the second weight of the sub-block.

7. The method according to claim 1, wherein the coding unit has four control points, and
the partitioning a coding unit into a plurality of sub-blocks comprises:
partitioning the coding unit into four sub-blocks, wherein each sub-block includes one control point;
the determining the second weight of the sub-block of the plurality of sub-blocks based on weights of control points comprises:
using a weight of the control point included in the sub-block as the second weight of the sub-block.

8. A video processing apparatus, comprising:
a memory storing instructions; and
one or more processors configured to execute the instructions to cause the apparatus to perform:
partitioning a coding unit into a plurality of sub-blocks, wherein the coding unit is associated with a first weight;
determining a second weight of a sub-block of the plurality of sub-blocks based on weights of control points, respectively, wherein the control points are neighboring corners of the coding unit; and
bi-predicting the sub-block based on the second weight.

9. The apparatus according to claim 8, wherein in determining the second weight of the sub-block within the coding unit, the one or more processors are further configured to execute the instructions to cause the apparatus to perform:
in response to the sub-block comprising one of the control points, using a weight of the one of the control points as the second weight of the sub-block, or
in response to the sub-block not comprising the control points, determining the second weight of the sub-block according to a pre-defined rule.

10. The apparatus according to claim 8, wherein:
the coding unit is partitioned into four sub-blocks and has two control points; and in determining the second weight of the sub-block within the coding unit, the one or more processors are further configured to execute the instructions to cause the apparatus to perform:
- in response to the sub-block comprising one of the two control points, using a weight of the one of the two control points as the second weight of the sub-block, or
- in response to the sub-block not comprising the two control points, setting the second weight of the sub-block to be one of:
  - a weight of one of the two control points with a shorter distance to the sub-block, or
  - a default value.

11. The apparatus according to claim 8, wherein:
the coding unit is partitioned into two sub-blocks and has three control points; and
in determining the second weight of the sub-block within the coding unit, the one or more processors are further configured to execute the instructions to cause the apparatus to perform:
- in response to the sub-block including only one of the three control points, using a weight of the one of the control points as the second weight of the sub-block, or
- in response to the sub-block comprising at least two of the three control points, using a default value or a weight of one of the two control points as the second weight of the sub-block.

12. The apparatus according to claim 8, wherein:
the coding unit is partitioned into four sub-blocks and has three control points, the three control points having a first control point weight, a second control point weight, and a third control point weight, respectively; and
in determining the second weight of the sub-block within the coding unit, the one or more processors are further configured to execute the instructions to cause the apparatus to perform:
- in response to the sub-block comprising at least one of the three control points, using a weight of the one of the control points as the second weight of the sub-block, or
- in response to the sub-block not comprising the three control points, setting the second weight of the sub-block to be one of:
  - an average value of the first control point weight, the second control point weight, and the third control point weight,
  - a middle value of the first control point weight, the second control point weight, and the third control point weight,
  - an equal weight of the coding unit,
  - one of the first control point weight, the second control point weight, and the third control point weight which has a smallest difference from the equal weight,
  - one of the first control point weight and the second control point weight which has a smaller difference from the equal weight, or
  - a default value.

13. The apparatus according to claim 8, wherein:
the coding unit has two control points; and
in partitioning a coding unit into a plurality of sub-blocks, the one or more processors are further configured to execute the instructions to cause the apparatus to perform:
- partitioning the coding unit into two sub-blocks, wherein each sub-block includes one control point; and
in determining the second weight of the sub-block of the plurality of sub-blocks based on weights of control points, the one or more processors are further configured to execute the instructions to cause the apparatus to perform:
- using a weight of the control point included in the sub-block as the second weight of the sub-block.

14. The apparatus according to claim 8, wherein:
the coding unit has four control points; and
in partitioning a coding unit into a plurality of sub-blocks, the one or more processors are further configured to execute the instructions to cause the apparatus to perform:
- partitioning the coding unit into four sub-blocks, wherein each sub-block includes one control point; and
in determining the second weight of the sub-block of the plurality of sub-blocks based on weights of control points, the one or more processors are further configured to execute the instructions to cause the apparatus to perform:
- using a weight of the control point included in the sub-block as the second weight of the sub-block.

15. A non-transitory computer readable medium storing a bitstream, wherein the bitstream comprises a flag indicating a coding unit being partitioned into a plurality of sub-blocks, wherein the flag causes a decoder to:
- determine a second weight of a sub-block of the plurality of sub-blocks based on weights of control points, respectively, wherein the control points are neighboring corners of the coding unit; and
- bi-predict the sub-block based on the second weight.

16. The non-transitory computer readable medium according to claim 15, wherein the flag further indicates the coding unit being partitioned into four sub-blocks and having two control points, and the flag further causes the decoder to:
- in response to the sub-block comprising one of the two control points, use a weight of the one of the two control points as the second weight of the sub-block, or
- in response to the sub-block not comprising the two control points, set the second weight of the sub-block to be one of:
  - a weight of one of the two control points with a shorter distance to the sub-block, or
  - a default value.

17. The non-transitory computer readable medium according to claim 15, wherein the flag further indicates the coding unit being partitioned into two sub-blocks and having three control points, and the flag further causes the decoder to:
- in response to the sub-block including only one of the three control points, use a weight of the one of the control points as the second weight of the sub-block, or
- in response to the sub-block comprising at least two of the three control points, use a default value or a weight of one of the two control points as the second weight of the sub-block.

18. The non-transitory computer readable medium according to claim 15, wherein the flag further indicates the coding unit being partitioned into four sub-blocks and having three control points, the three control points having a first control point weight, a second control point weight, and a third control point weight, respectively, and the flag further causes the decoder to:
- in response to the sub-block comprising at least one of the three control points, use a weight of the one of the control points as the second weight of the sub-block, or
- in response to the sub-block not comprising the three control points, set the second weight of the sub-block to be one of:
  - an average value of the first control point weight, the second control point weight, and the third control point weight,
  - a middle value of the first control point weight, the second control point weight, and the third control point weight,
  - an equal weight of the coding unit,
  - one of the first control point weight, the second control point weight, and the third control point weight which has a smallest difference from the equal weight,
  - one of the first control point weight and the second control point weight which has a smaller difference from the equal weight, or
  - a default value.

19. The non-transitory computer readable medium according to claim 15, wherein the flag further indicates the coding unit having two control points and the coding unit being partitioned into two sub-blocks, each sub-block including one control point, and the flag further causes the decoder to:
- use a weight of the control point included in the sub-block as the second weight of the sub-block.

20. The non-transitory computer readable medium according to claim 15, wherein the flag further indicates the coding unit having four control points and the coding unit being partitioned into four sub-blocks, each sub-block including one control point, and the flag further causes the decoder to:
- use a weight of the control point included in the sub-block as the second weight of the sub-block.

* * * * *